Feb. 17, 1959  J. A. DE PALMA  2,874,367
HIGHWAY SIGNALLING SYSTEM
Filed June 8, 1954  13 Sheets-Sheet 1

INVENTOR.
J. A. DE PALMA
BY Forest B. Hitchcock
HIS ATTORNEY

Feb. 17, 1959  J. A. DE PALMA  2,874,367
HIGHWAY SIGNALLING SYSTEM
Filed June 8, 1954  13 Sheets-Sheet 2

DIAGRAMS FOR SLOW
SPEED VEHICLE

INVENTOR.
J. A. DE PALMA
BY
Forest B. Hitchcock
HIS ATTORNEY

Feb. 17, 1959   J. A. DE PALMA   2,874,367
HIGHWAY SIGNALLING SYSTEM
Filed June 8, 1954   13 Sheets-Sheet 3

DIAGRAMS FOR NORMAL
SPEED VEHICLE

INVENTOR.
J. A. DE PALMA
BY
Forest B. Hitchcock
HIS ATTORNEY

Feb. 17, 1959  J. A. DE PALMA  2,874,367
HIGHWAY SIGNALLING SYSTEM
Filed June 8, 1954  13 Sheets—Sheet 4

DIAGRAMS FOR FAST
SPEED VEHICLE

INVENTOR.
J. A. DE PALMA
BY
Forest B. Hitchcock
HIS ATTORNEY

Feb. 17, 1959  J. A. DE PALMA  2,874,367
HIGHWAY SIGNALLING SYSTEM
Filed June 8, 1954  13 Sheets—Sheet 5

DIAGRAMS FOR SLOW AND
NORMAL SPEED VEHICLES

INVENTOR.
J. A. DE PALMA
BY
Forest B. Hitchcock
HIS ATTORNEY

Feb. 17, 1959  J. A. DE PALMA  2,874,367
HIGHWAY SIGNALLING SYSTEM
Filed June 8, 1954  13 Sheets-Sheet 6

INVENTOR.
J. A. DE PALMA
BY
Forest B. Hitchcock
HIS ATTORNEY

Feb. 17, 1959　　　　　J. A. DE PALMA　　　　2,874,367
HIGHWAY SIGNALLING SYSTEM
Filed June 8, 1954　　　　　　　　　　　　13 Sheets-Sheet 7

INVENTOR.
J.A. DE PALMA
BY Forest B. Hitchcock
HIS ATTORNEY

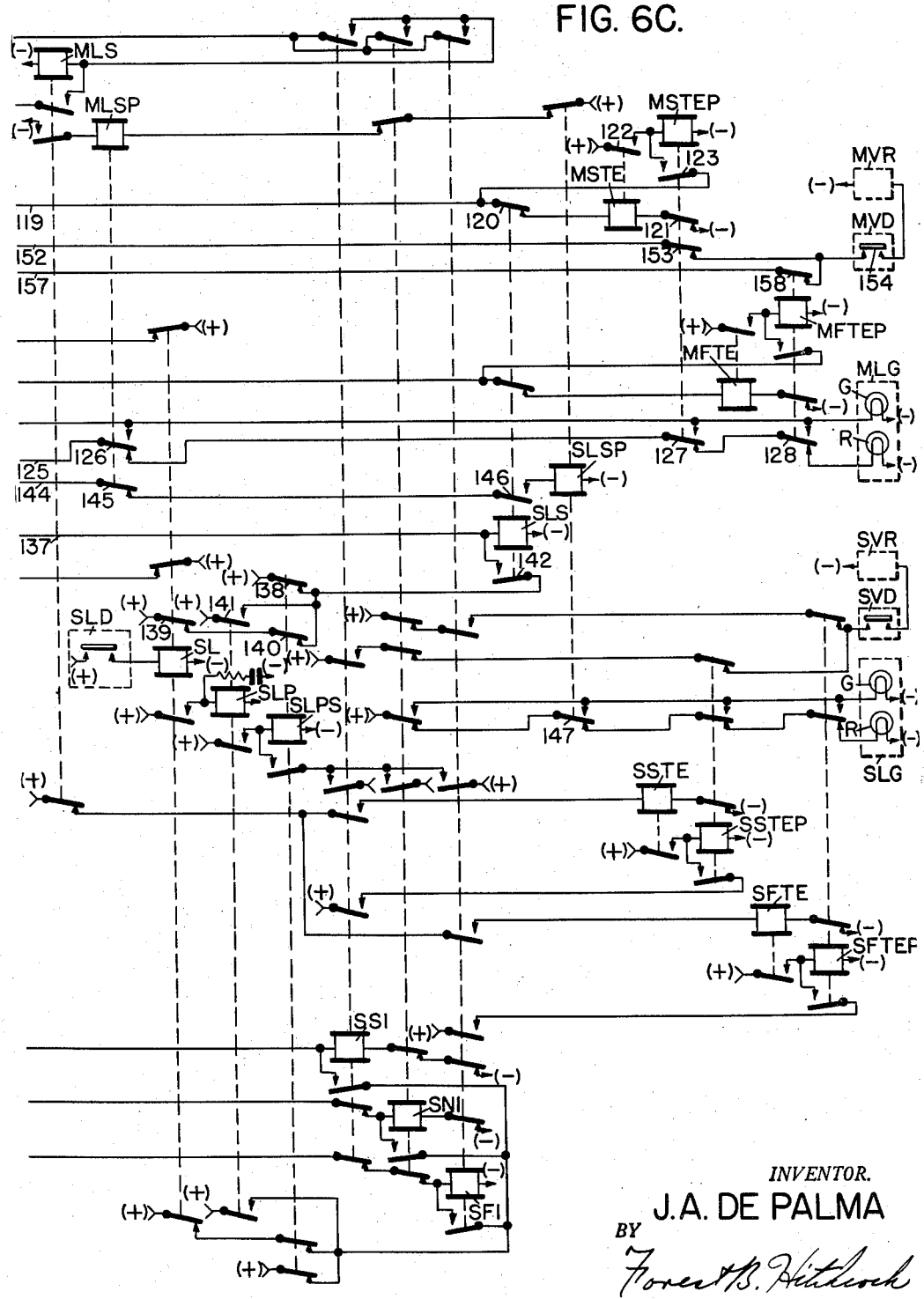

Feb. 17, 1959 J. A. DE PALMA 2,874,367
HIGHWAY SIGNALLING SYSTEM
Filed June 8, 1954 13 Sheets-Sheet 9

INVENTOR.
J. A. DE PALMA
BY
*Forest B. Hitchcock*
HIS ATTORNEY

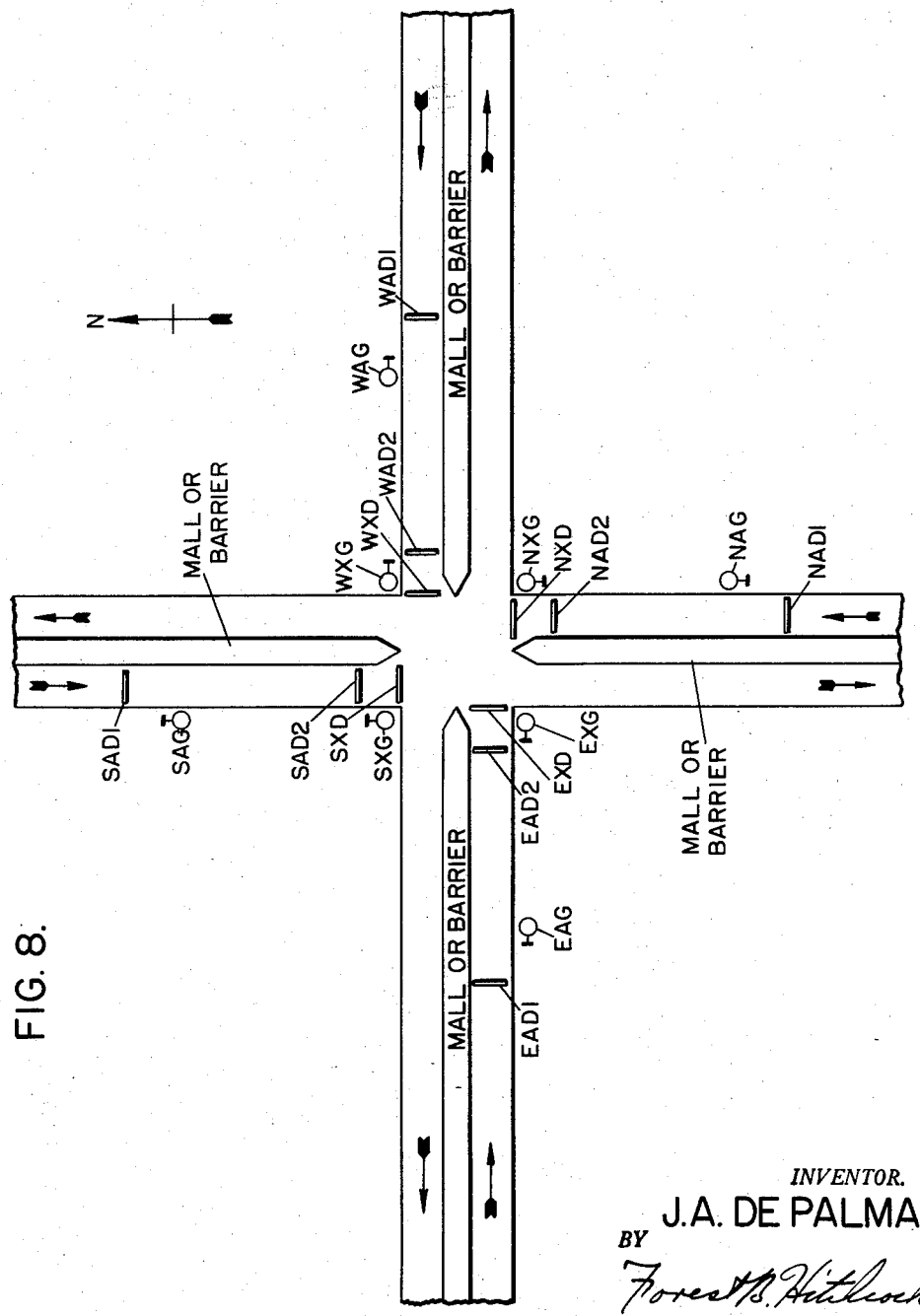

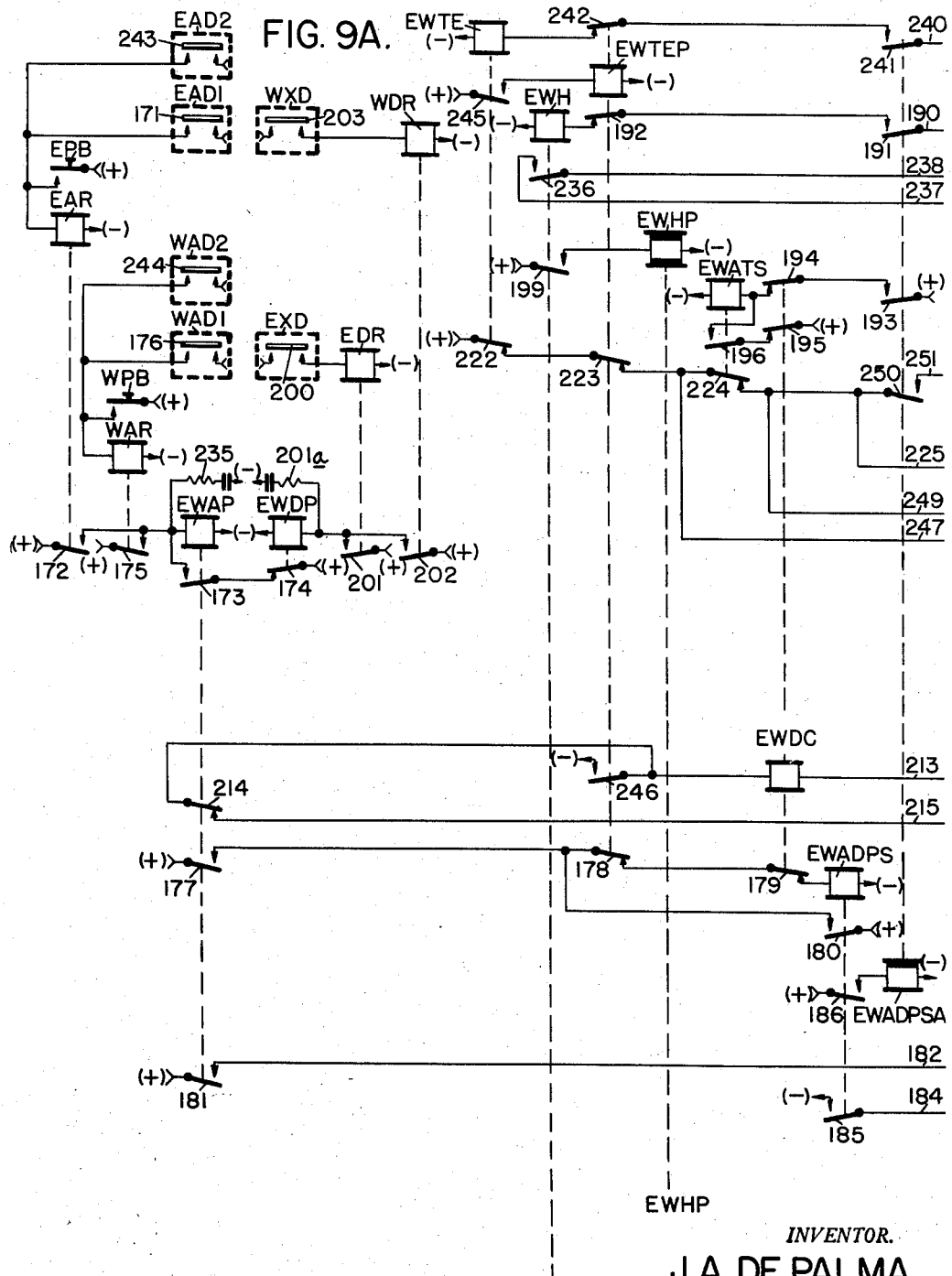

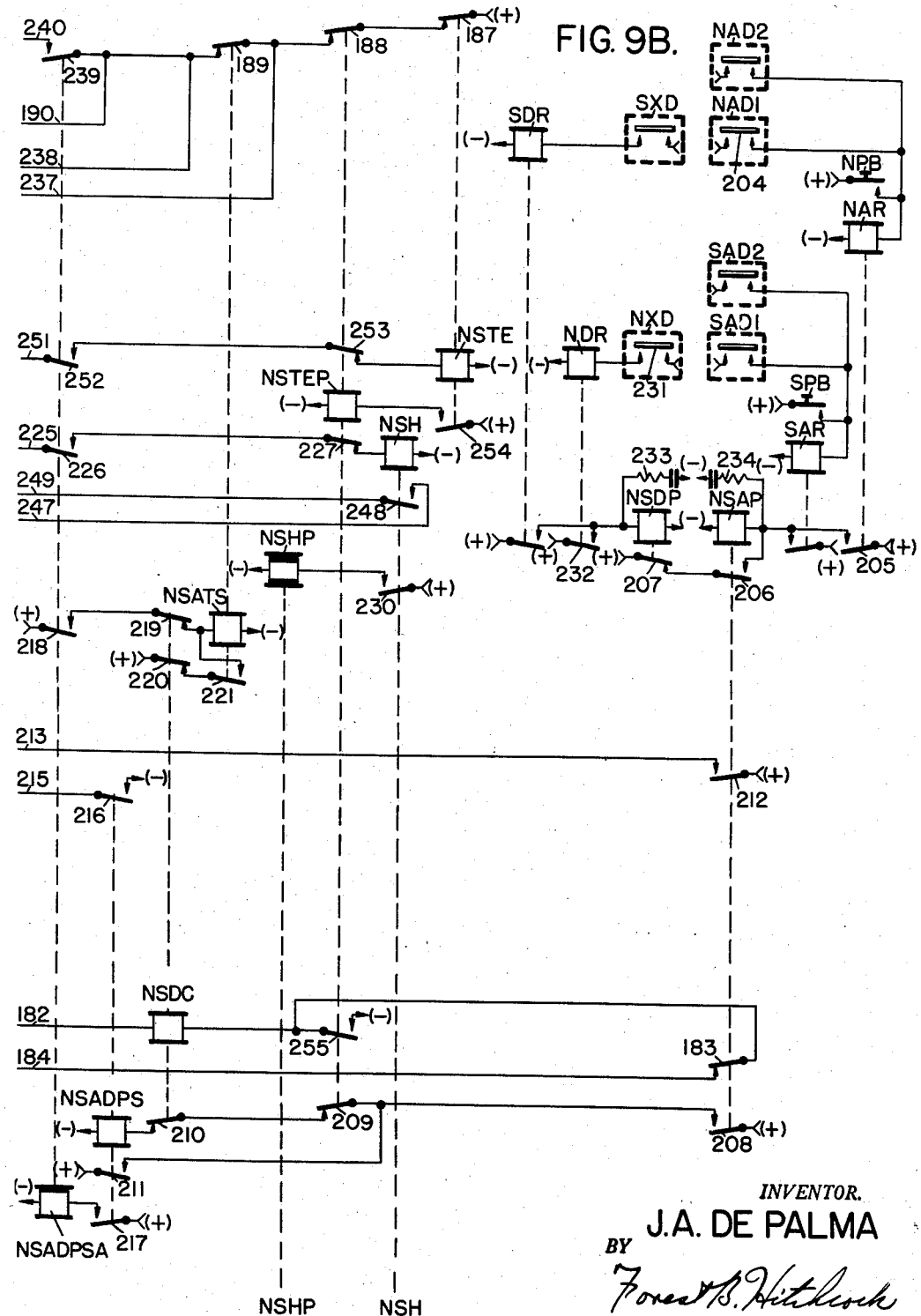

Feb. 17, 1959  J. A. DE PALMA  2,874,367
HIGHWAY SIGNALLING SYSTEM
Filed June 8, 1954  13 Sheets—Sheet 13

INVENTOR.
J. A. DE PALMA
BY
Forest B. Hitchcock
HIS ATTORNEY

United States Patent Office 2,874,367
Patented Feb. 17, 1959

2,874,367

HIGHWAY SIGNALLING SYSTEM

James A. De Palma, Rochester, N. Y.

Application June 8, 1954, Serial No. 435,104

15 Claims. (Cl. 340—31)

This invention relates to a highway signaling system for governing automobile traffic and, more particularly, pertains to a system of signaling for a highway divided for opposite directions of traffic, there being but a single lane for traffic in each direction except at spaced locations where dual lanes are provided.

It is well known that the ordinary highway having only two traffic lanes, one for each direction, is unsafe with present day congestion of traffic since vehicles travelling in one lane of traffic must use the other lane for passing purposes. Due to this congestion of traffic and the limitations of ordinary two-lane highways, there is a trend toward the building of four-lane highways having two lanes for each direction separated by a mall. Such highways are expensive and are efficient only where the traffic is very dense.

In view of the above considerations and in accordance with the present invention, it is proposed that a highway having two lanes, one for traffic in each direction, be divided to prevent the passage of traffic between the two lanes. At intervals along each directional lane, it is proposed that dual lanes, or passing lanes, be provided with a signaling system capable of governing traffic speeds by the segregation of vehicles travelling at normal speeds from those travelling at abnormal speeds. It is further proposed that the segregation of traffic be such that vehicles travelling at either low or high speeds are penalized by requiring such vehicles to stop at particular points while vehicles travelling at normal speeds are allowed to proceed unrestricted. Thus, the purposes of this signaling system are to cause slow-speed vehicles to be stopped at dual lane locations to permit either normal-speed vehicles or fast-speed vehicles to pass them and to cause fast-speed vehicles to be stopped at dual lane locations if such vehicles are exceeding the highway speed limit in approaching such locations.

More specifically, it is proposed that when a group of vehicles is approaching a dual lane location (conveniently termed a passing siding) that the entrance signals for the two lanes be dark until the first vehicle has entered either of the two lanes. Upon entering one of the two lanes, the first vehicle, by virtue of its speed classification, determines the aspects to be displayed by the entrance signals for both lanes.

If the first vehicle is travelling at a slow speed it will cause the entrance signals to designate its lane as a slow-speed lane and the other lane as a normal-speed lane. Thus, the following vehicles segregate themselves between the two lanes in accordance with the speeds at which they choose to travel. The leaving signal for the slow-speed lane is caused to display a stop indication while the leaving signal for the normal-speed lane is caused to display a green indication. After the vehicles travelling the normal-speed lane have departed from the dual lane location, the leaving signal for the normal-speed lane is caused to display a stop indication while the leaving signal for the slow-speed lane is caused, after a predetermined period of time, to display a green aspect, the slow-speed vehicles being allowed to proceed.

If the first vehicle is travelling at a fast speed in excess of the speed limit, it will cause the entrance signals to designate its lane as a fast-speed lane and the other lane as a normal-speed lane, the entrance signals for the two lanes displaying stop and green aspects respectively. The leaving signal for the fast-speed lane is caused to display a stop indication for a predetermined period of time after which the signal will permit the fast-speed car to proceed. However, the arrival of following cars at the normal-speed lane within a predetermined time interval will cause the leaving signal for the normal-speed lane to display a green aspect while causing the leaving signal for the fast-speed lane to retain a stop aspect until the following cars have departed from the normal-speed lane.

With an arrangement of the type proposed above, there is no advantage for any vehicle travelling at high speeds since the overall average speeds of such vehicles will be held to the normal speed range by the penalties imposed by the signalling system, thus automatically causing high-speed drivers to reduce their speeds to the normal range. Similarly, the penalties applied to slow-speed drivers tend to cause them to increase their speeds to the normal range. In this way, traffic tends to assume a uniform rate of flow which is the natural basis for obtaining the maximum carrying capacity for any highway.

An object of this invention is to provide a system of signaling for a divided highway having a single lane for traffic in each direction and having dual lanes, or passing lanes, spaced at intervals along each directional lane.

Another object of this invention is to provide a signaling system capable of penalizing vehicles travelling at low or high speeds while imposing no penalties on vehicles travelling at speeds within a normal range.

Another object of this invention is to provide a highway signaling system capable of permitting vehicles travelling at speeds within the normal range to pass vehicles travelling at slow speeds.

A further object of this invention is to provide a highway signaling system having signals located at the entering and leaving ends of dual lane locations along a highway of the type described, such signals being controlled by the detection of traffic and of traffic speeds by detection devices.

Another object of this invention is to provide a signaling system for governing traffic at highway intersections, the signaling system being capable of detecting and governing traffic approaching an intersection from any direction.

The feature herein disclosed, which relates to the control of highway traffic at an intersection, is disclosed and claimed in my divisional application Ser. No. 724,372, filed March 27, 1958.

Other objects, purposes and characteristic features of the present invention will be in part obvious from the accompanying drawings and in part pointed out as the description of the invention progresses.

In the accompanying drawings:

Figs. 6A–6D show diagrammatically the various traffic signals, detection apparatus and operating circuits for a dual lane location for one direction of highway traffic;

Fig. 7 is a layout plan showing the way in which Figs. 6A–6D are related and must be correlated to present the complete circuit and apparatus layout for a dual lane location for one direction of highway traffic;

Fig. 8 shows a highway intersection along with various traffic signals and traffic detection devices; and Figs. 9A–9C show diagrammatically the various traffic signals, detection apparatus and operating circuits for a highway intersection signaling system.

Figure 1A:
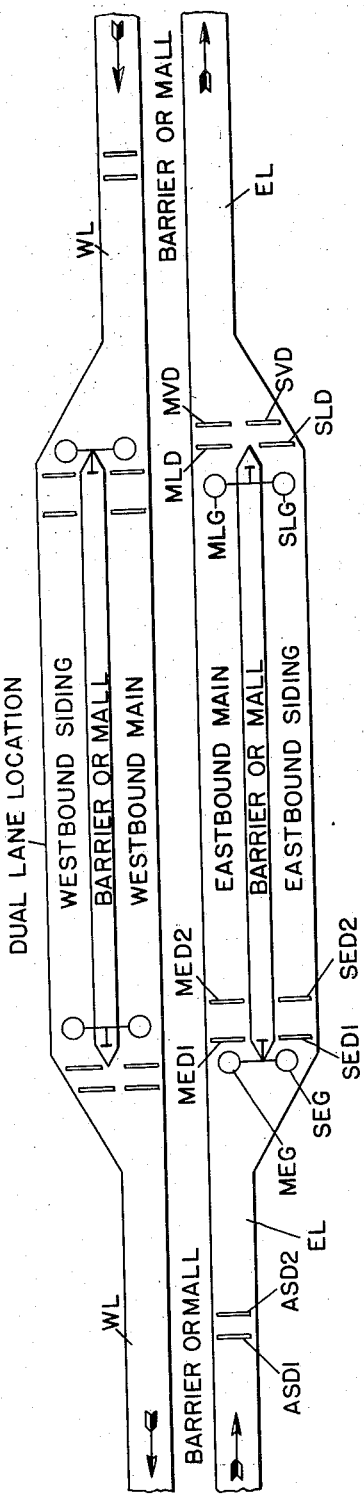
Fig. 1A shows diagrammatically a section of a highway at a dual lane, or passing siding, location. Traffic signals and various traffic and traffic speed detection devices associated with the dual lane location are shown for both directions of traffic.

In order to simplify the illustrations in the drawings and facilitate in the explanation of the fundamental characteristics of the invention, various parts and circuits have been shown diagrammatically in accordance with conventional symbols. Arrows with associated symbols (+) and (−) are employed to indicate connections of the circuits of the various relays and other apparatus to the opposite terminals of a suitable source of energy for the energization of such relays and apparatus; and the source of energy may be of any suitable characteristic for the purpose intended. The various contacts of the relays involved in the illustrations are shown conventionally as being in a lower or inclined position when the coil or winding of the associated relay is deenergized, and in a raised or horizontal position when the relay is energized; the contacts belonging to any given relay are shown connected to its coil or winding by dotted lines, and these contacts may be either below or above the illustration of the relay winding. The front and back contacts between which the movable contacts are operated by the different relays are shown conventionally as arrowheads, and the movable contacts are ordinarily of the type which have their contacts pulled downwardly by gravity or by spring action.

Referring now to Fig. 1A, a section of an east-west highway is shown. The highway is assumed to consist of a single lane EL for east-bound traffic and a single lane WL for west-bound traffic, the lanes EL and WL being separated by a barrier or mall to prevent the passage of traffic between the two lanes. Arrows indicate the direction of traffic movement through the highway.

At an intermediate point along the directional lane EL a dual lane, or passing siding, location is shown, the lanes being identified as Eastbound Main and Eastbound Siding. A barrier separates the Eastbound Main from the Eastbound Siding to prevent the passage of traffic between the two lanes. The purpose of the dual lane location is to permit cars to safely pass other cars travelling at speeds below or above the normal range for the highway.

A similar dual lane location is shown along the westbound lane WL.

Figure 1B:
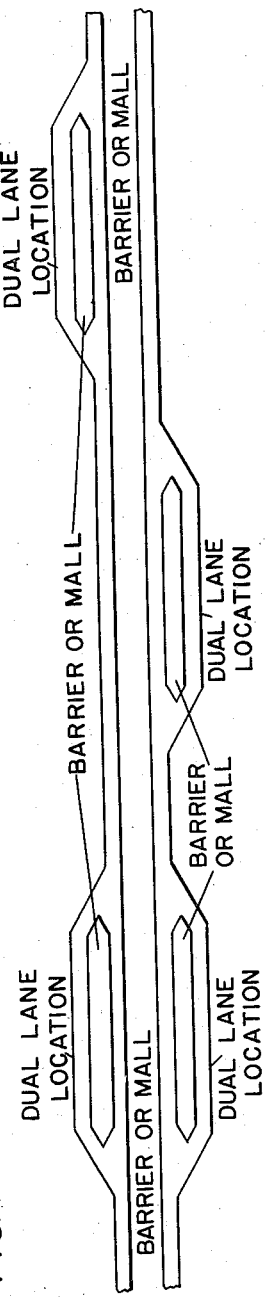
Fig. 1B shows a section of a highway organized to include a plurality of the dual lane locations shown in detail in Fig. 1A.

It is assumed that a number of similar dual lane locations are provided along the highway (see Fig. 1B), the number and lengths of such locations being dependent upon traffic conditions for the highway.

Since all dual lane locations can be considered identical from functional and operational standpoints, further description can be confined to the dual lane location for east-bound traffic, the dual lanes being referred to as the main and the siding.

An electrical circuit network is provided for a dual lane location. The circuit network is actuated by various detection devices and serves to control the aspects displayed by various traffic signals.

Two approach speed detection devices ASD1 and ASD2 are located in the highway EL on the approach to the dual lane location. The distance between the detection devices ASD1 and ASD2 is arbitrary and is dependent upon the speeds normally encountered on the highway. Similarly, the relative distance between the detector ASD2 and the dual lane location depends on the range of speeds encountered. It is assumed that the detectors ASD1 and ASD2 are of the treadle type, although photo-electric cells or other electronic devices can be employed.

As cars pass over the detectors ASD1 and ASD2, the electrical network is actuated, the circuit network being capable of assuming and storing a description of the speed range into which the cars fall. Only one speed description per group of cars can be stored in the circuit network; and since the first car is assumed to be pacing the group, the speed of the first car only is detected.

After a predetermined time interval, the circuit network can detect and store a speed description for another group of cars. However, it is further assumed that the time interval is such that no conflict between speed descriptions can result from the over-taking of one group of cars by another group at the dual lane location. In other words, if the spacing between successive groups of cars is great enough to permit the circuit network to store two speed descriptions, then the first group of cars is assumed to leave the dual lane location before the second group enters the location.

Two color light traffic signals MEG and SEG are located at the entrance of the main and the siding, respectively. The signals MEG and SEG govern traffic entering their respective lanes. Under initial conditions of operation (i. e. no cars occupy the dual lane location), the signals MEG and SEG are dark, it being assumed that dark signals impose no restrictions on traffic movement so that the first car approaching has a choice of entering either the main or the siding lane.

The entrance signals MEG and SEG are controlled by the circuit network in accordance with the speeds detected by the detectors ASD1 and ASD2.

A main entrance detector MED1 is provided at the entrance to the main to detect cars entering the main, a similar detector SED1 being provided at the entrance to the siding. The detectors MED1 and SED1 are of the same type previously described for the detectors ASD1 and ASD2, and, when occupied by cars, cause the circuit network to control the normally dark signals MEG and SEG to display lighted aspects.

To summarize the preceding description: As a group of cars approaches the dual lane location, the speed of the first car is detected and stored in the circuit network through the action of the detectors ASD1 and ASD2. The entrance signals MEG and SEG present dark aspects to the approaching group of cars indicating that either the main or the siding can be entered. Regardless of which route is chosen by the first car, the entrance signals MEG and SEG are caused to display a lighted aspect when the first car occupies either of the entrance detectors MED1 or SED1.

The aspects displayed by the signals MEG and SEG are determined by the speed of the first car in the group and govern the following cars in the group insofar as to which route they take. In other words, the other cars are directed either to follow the first car or to take the alternate lane to pass the first car. If the first car is detected as a normal-speed car, the signals MEG and SEG direct the remainder of the cars to follow the first car; but if the first car is detected as a fast-speed or a slow-speed car, the signals direct the remainder of the cars to take the alternate lane to escape signaling penalties to be described which are applied to cars travelling at speeds below or above the normal range.

If the first car is a normal-speed car, the signals MEG and SEG each display an illuminated aspect until the first car passes a second entrance detector MED2 or SED2; and the signals then return to a dark condition. If the first car is a slow-speed or a fast-speed car the signals each display an illuminated aspect until the first car leaves the dual lane location; the signals then returning to a dark condition.

The second main entrance detector MED2 is located in the main to detect the passage of traffic. The detector MED2 is of the type previously described and functions primarily to cause the transfer of stored speed descriptions through the electrical circuit network for the control of a main leaving signal MLG, the similar detector SED2 and a similar leaving signal SLG being provided for the siding.

The leaving signals MLG and SLG display stop, or red, aspects normally. Proceed, or green, aspects are controlled by the circuit network after the second entrance detector MED2 or SED2 for a route is occupied. A first car travelling at a normal speed through the main causes the main leaving signal MLG to display a green aspect, the siding leaving signal SLG continuing to display a red aspect. Similarly, a normal-speed first car choosing to travel through the siding causes the signal SLG to display a green aspect when the car passes over the detector SED2; and the leaving signal MLG continues to display a red aspect.

If the first car is a slow-speed or a fast-speed car choosing to travel over the main, the detection of the car by the detector MED2 causes a timing device to operate in the circuit network; and the leaving signal MLG displays a red aspect until the timing device has completed its operation. In other words, a predetermined time penalty is applied to cars travelling at speeds above or below the normal range. The subsequent passing of the siding entrance detector SED2 by the remainder of the cars in the group causes the timing device associated with the main leaving signal MLG to be inoperative and causes the leaving signal SLG to display a green aspect. The signal SLG continues to display a green aspect until all of the remainder of the cars in the group leave the dual lane location, their departure being detected by a leaving detector SLD of the type previously described. After the cars travelling over the siding have departed from the dual lane location the signal SLG reverts to displaying a red aspect and the timing device associated with the signal MLG operates to cause the ultimate displaying of a green aspect by the signal MLG. The first car then leaves the main causing the signal MLG to become red when the car passes over a detector MLD of the type previously described, the entrance signals MEG and SEG being returned to a dark condition. Similar operational effects are produced regardless of which route, the main or the siding, is chosen by the first car or cars.

A main violation detector MVD is located in the main to detect cars passing the leaving signal MLG in violation of that signal. If a car passes the signal MLG while the signal displays a red aspect, the detector MVD in conjunction with the circuit network can cause a camera, spray gun, or other device to be actuated to indicate a signal violation by the car. A similar detector SVD is provided for the siding.

To further describe the operations of the various traffic signals in response to the passing of detection devices by traffic, reference is made to Figs. 2A–2G which trace the movement of a slow-speed car through a dual lane location. In the Figs. 2A–2G the dual lane location is represented diagrammatically along with the various detection devices and signals. The detection devices are represented by dots while the signals are represented by circles containing reference characters which indicate the aspects dark D, red R, yellow Y, and green G displayed by the signals. For simplicity, reference characters are assigned to the detection devices in Fig. 2A only.

Figure 2A:
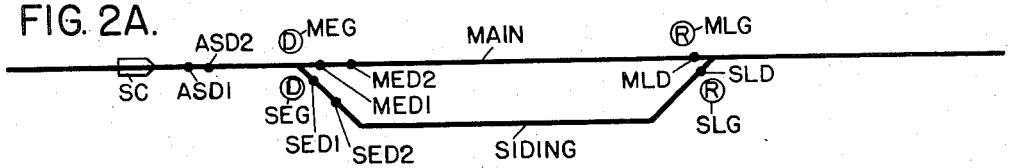
Figs. 2A–2G show a dual lane location for one direction of highway traffic and trace the sequence of traffic signal aspects in relation to the movements of a slow-speed car through the highway section.
Figure 2B:
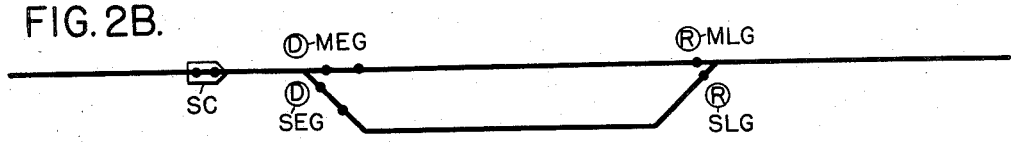
Figure 2C:
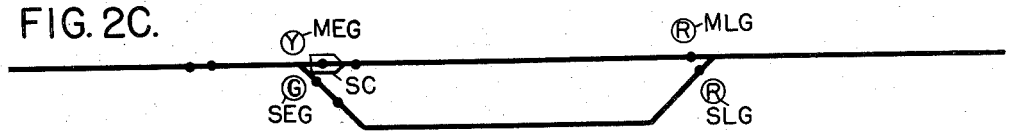
Figure 2D:
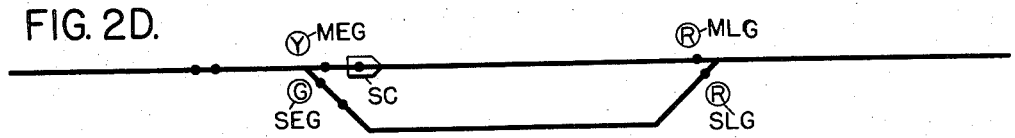

In Fig. 2A, a slow-speed car SC is shown approaching the speed detectors ASD1 and ASD2. The entrance signals MEG and SEG display dark D aspects while the leaving signals MLG and SLG display red R aspects.

When the slow-speed car SC passes over the detectors ASD1 and ASD2 (see Fig. 2B) no change occurs in the aspects displayed by the various signals, although a speed description is assumed and stored in the electrical circuit network associated with the dual lane location.

It is assumed that the slow-speed car SC chooses to pass through the dual lane location via the main. When the car SC passes over the entrance detector MED1 (see Fig. 2C) the circuit network causes the main entrance signal MEG to display a yellow aspect while the siding entrance signal SEG is caused to display a green aspect. At this point, a following car is presented with the choice of either following the slow-speed car SC with the warning that it will be restricted at the leaving end of the main or taking the route over the siding to pass the slow-speed car SC with no restriction.

Further progress of the car SC over the detector MED2 (see Fig. 2D) causes no further change in the aspects displayed by the signals. However, the speed description stored for the slow-speed car SC is transferred in the circuit network and a timing device is actuated. The main leaving signal MLG cannot be controlled by the transferred speed description to display a green aspect until the timing device completes its operation.

Figure 2E:
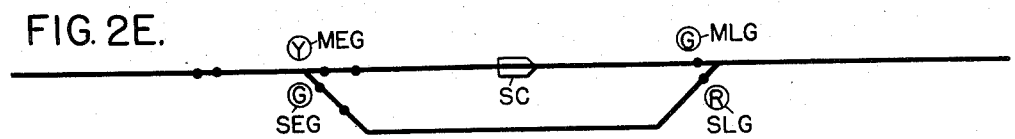
Figure 2F:
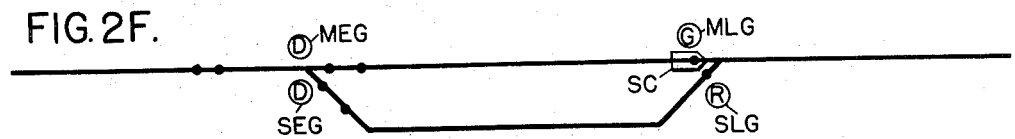

In Fig. 2E the slow-speed car SC is shown at an intermediate point during its progress through the main. The timing device previously actuated by the car SC has completed its operation causing the main leaving signal MLG to display a green aspect.

When the car SC passes over the main leaving detector MLD (see Fig. 2F) the entrance signals MEG and SEG are caused to display dark aspects. The leaving signal MLG continues to display a green aspect until the car SC leaves the dual lane location.

Figure 2G:
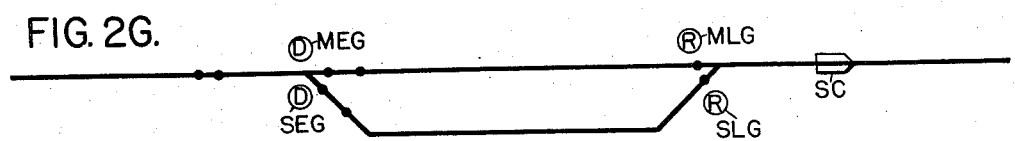

In Fig. 2G the slow-speed car SC is shown after leaving the dual lane location. The entrance signals MEG and SEG display dark indications while the leaving signals MLG and SLG display red indications, such being the normal conditions for the signals. The speed description stored for the car SC in the circuit network is cancelled when the car SC completely passes the leaving detector MLD.

Similar signal and circuit operations can be described for a slow-speed car SC choosing to travel through the siding rather than the main.

The progress of a car travelling through a dual lane location at a normal speed is traced in Figs. 3A–3G, the representation of the various signals and detectors being as previously described in Figs. 2A–2G.

Figure 3A:
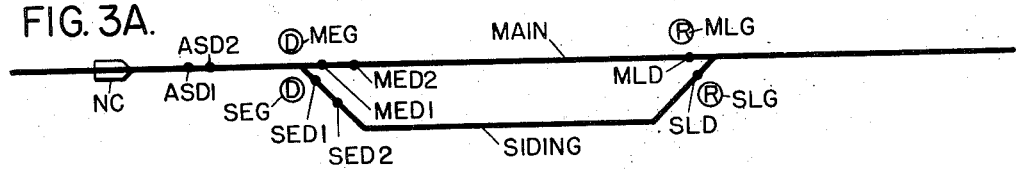
Figs. 3A–3G show a dual lane location for one direction of highway traffic and trace the sequence of traffic signal aspects in relation to the movements of a normal-speed car through the highway section.
Figure 3B:
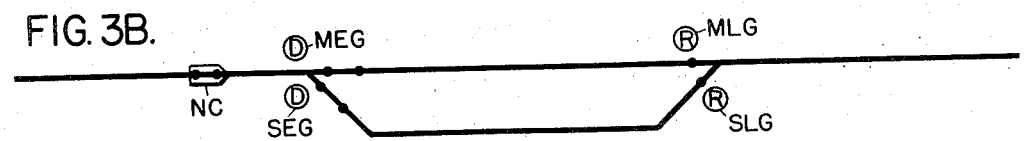
Figure 3C:
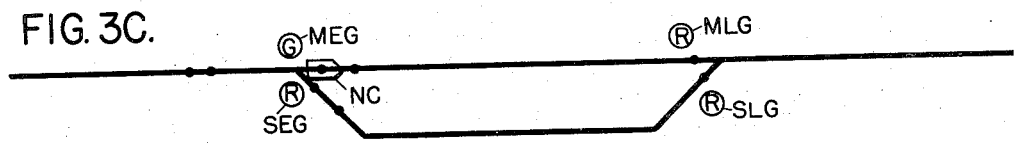
Figure 3D:
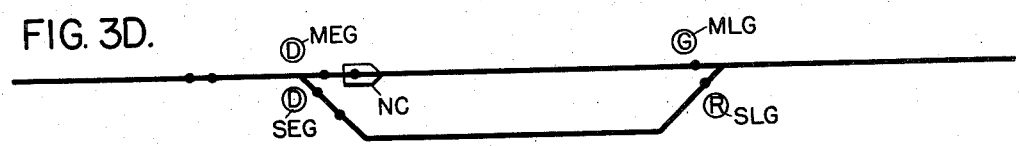

In Fig. 3A a normal-speed car NC is shown approaching the detectors ASD1 and ASD2. The entrance signals MEG and SEG display dark aspects while the leaving signals MLG and SLG display red aspects.

When the normal-speed car NC passes over the detectors ASD1 and ASD2 (see Fig. 3B) no change occurs in the aspects displayed by the signals although a speed description is assumed and stored in the circuit network associated with the dual lane location.

Assuming that the car NC chooses to enter the main and occupies the detector MED1 (see Fig. 3C), the entrance signal MEG is caused to display a green aspect while the entrance signal SEG is caused to display a red aspect. At this point any following cars are directed to follow the normal-speed car NC and are restricted from attempting to pass the normal-speed car by entering the siding. This condition is in keeping with the safety conditions prescribed for the highway in that no car should attempt to pass a car travelling at a speed within the normal range.

When the car NC passes over the detector MED2 (see Fig. 3D) the speed description stored in the circuit network is transferred causing the main leaving signal MLG to display a green aspect. The entrance signals MEG and SEG are caused to revert to their normal condition of displaying dark aspects. The reason for such a mode of signal operation will become evident when a description of circuit network operation is disclosed.

Figure 3E:
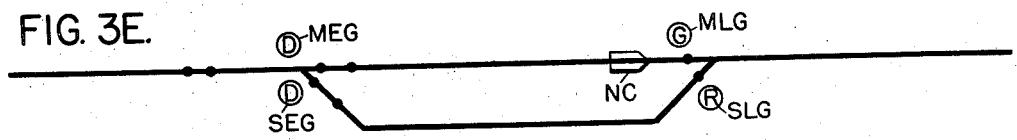
Figure 3F:
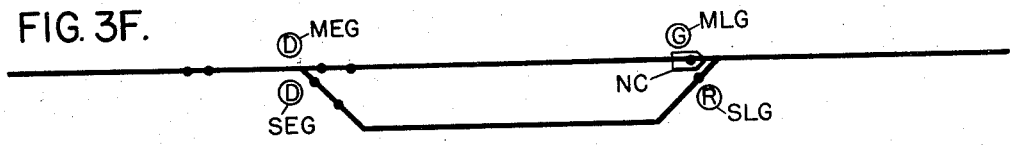
Figure 3G:
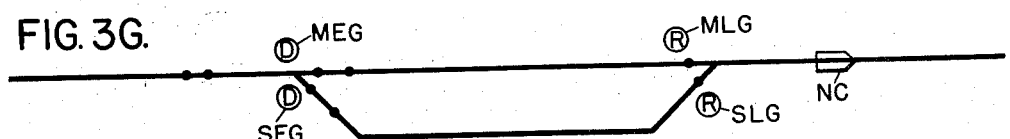

In Fig. 3E the normal-speed car NC is shown at an intermediate point along the main, the signal aspects remaining unchanged.

As the normal-speed car NC passes over the leaving detector MLD (see Fig. 3F) no change appears in the aspects displayed by the signals; but when the normal speed car NC completes its passage over the detector MLD (see Fig. 3G) the speed description stored in the circuit network for the car is cancelled and the main leaving signal MLG is caused to display a stop indication.

The progress of a car travelling at a fast speed is traced in Figs. 4A–4G, the various signals and detection devices being represented as previously described for Figs. 2A–2G.

Figure 4A:
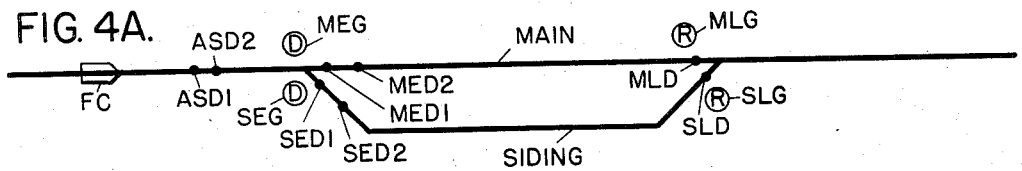
Figs. 4A–4G show a dual lane location for one direction of highway traffic and trace the sequence of traffic signal aspects in relation to the movements of a fast-speed car through the highway section.
Figure 4B:
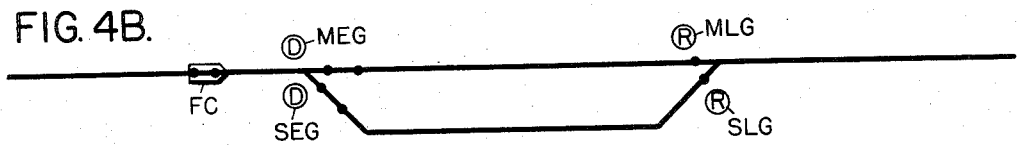
Figure 4C:
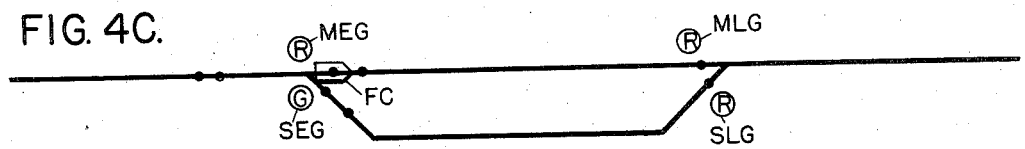

In Fig. 4A a fast-speed car FC is shown approaching the detection devices ASD1 and ASD2. The entrance signals MEG and SEG display dark indications while the leaving signals MLG and SLG display red indications.

When the car FC passes over the detectors ASD1 and ASD2 (see Fig. 4B) no change occurs in the aspects displayed by the signals although a speed description is assumed and stored in the circuit network associated with the dual lane location.

Assuming that the car FC chooses to enter the main and occupies the detector MED1 (see Fig. 4C), the entrance signal MEG is caused to display a red aspect while the siding entrance signal SEG displays a green aspect. At this point a following car is directed to enter the siding to escape a signalling penalty which will be imposed on the fast-speed car FC.

Figure 4D:
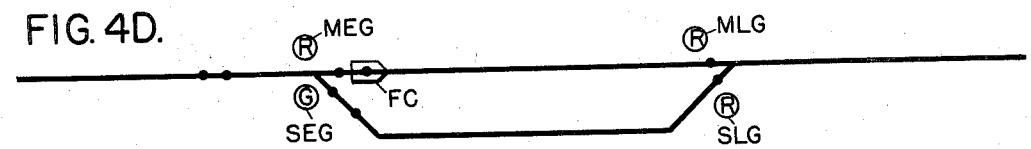

In Fig. 4D the fast-speed car FC is passing the detector MED2. No change occurs in the aspects displayed by the signals; but the speed description stored for the fast car is transferred in the circuit network and a timing device is actuated. The main leaving signal MLG cannot display a green aspect in response to the transfer of the speed description until the timing device completes its operation.

Figure 4E:
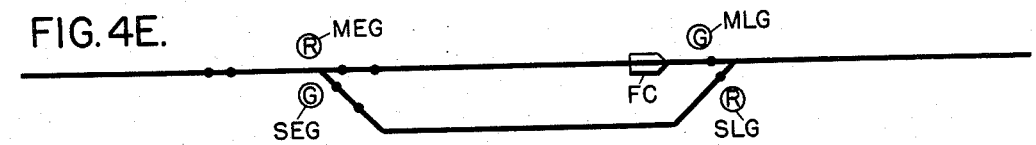

In Fig. 4E the fast-speed car FC is shown at the leaving end of the main. It is assumed that the timing device previously actuated by the passage of the car over the detector MED2 has completed its operation causing the leaving signal MLG to display a green aspect. It is assumed that the operating time of the timing device is such that a fast-speed car is forced to stop by the signal MLG before the car can proceed upon a subsequent clearing of the signal. In this manner, cars travelling at speeds above the normal range are held to a normal speed average through the highway.

Figure 4F:
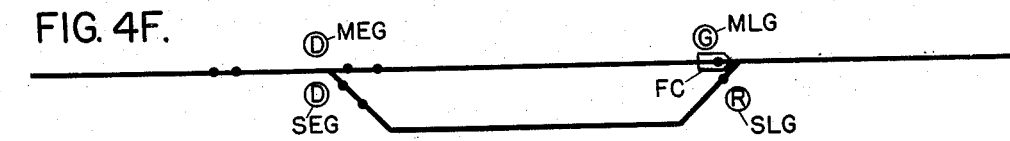
Figure 4G:
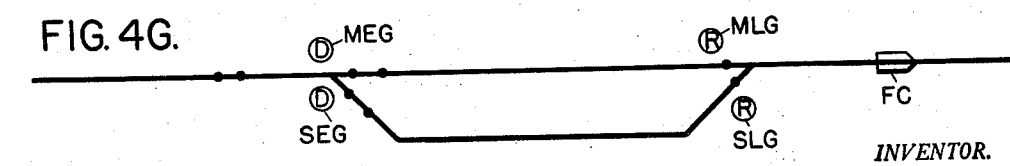

When the fast-speed car is passing over the leaving detector MLD no change occurs in the aspects displayed by the signals (see Fig. 4F). After the fast-speed car FC completes its passage over the detector MLD (see Fig. 4G) the speed description stored in the circuit network is cancelled and the signals assume their normal aspects.

Figure 5A:
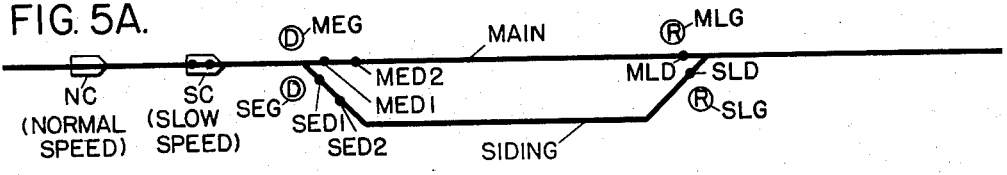
Figs. 5A–5G show a dual lane location for one direction of highway traffic and trace the sequence of traffic signal aspects in relation to the movements of a slow-speed car followed by another car which prefers to travel at a faster speed.
Figure 5B:
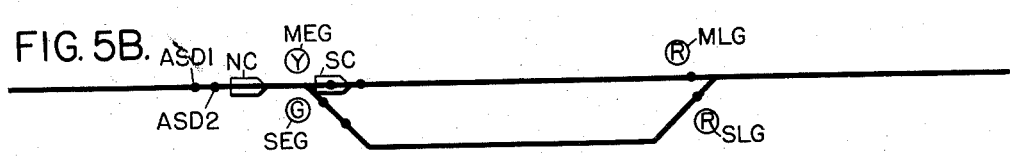
Figure 5C:
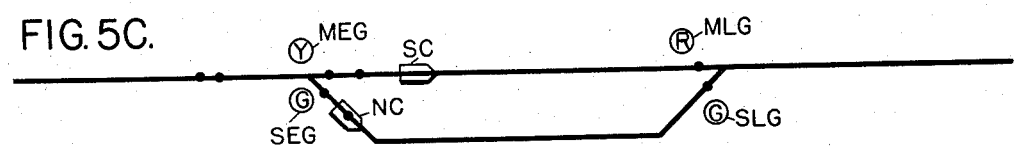

In Figs. 5A–5G a slow-speed car SC followed by another car NC desiring to travel at a normal speed is shown travelling through the dual lane location, the various signals and detection devices being shown as previously described for Figs. 2A–2G. In Fig. 5A the slow-speed car SC is shown passing over the detectors ASD1 and ASD2. The entrance signals MEG and SEG display dark aspects while the leaving signals MLG and SLG display red aspects. A speed description for the slow car SC is assumed and stored in the circuit network associated with the dual lane location; and this speed description applies also to the following normal-speed car NC. In other words, the two cars SC and NC are described to the circuit network according to the speed category into which the first car falls.

Assuming that the slow-speed car SC chooses to enter the main, the entrance signals MEG and SEG are caused to display yellow and green aspects, respectively, when the slow car SC passes over the entrance detector MED1. The normal-speed car now has a choice of routes in that it may accept the green signal SEG to pass the slow-speed car or it may accept the yellow signal MEG to follow the slow-speed car with the warning that a signaling restriction is to follow.

Assume that the normal-speed car chooses to enter the siding and pass the slow-speed car SC. When the slow-speed car SC passes over the detector MED2 the speed description stored in the circuit network is transferred and the timing device associated with the leaving signal MLG is actuated. The arrival of the normal-speed car NC on the siding entrance detector SED2 (see Fig. 5C) causes no change in the aspects displayed by the entrance signals MEG and SEG, but causes the siding leaving signal SLG to display a green aspect. Furthermore, the timing device actuated by the slow-speed car SC is caused to cease operation by the passage of the normal-speed car NC over the detector SED2. In this manner, the main leaving signal MLG is prevented from displaying a proceed aspect until the normal-speed car NC completes its passage through the siding.

Figure 5D:
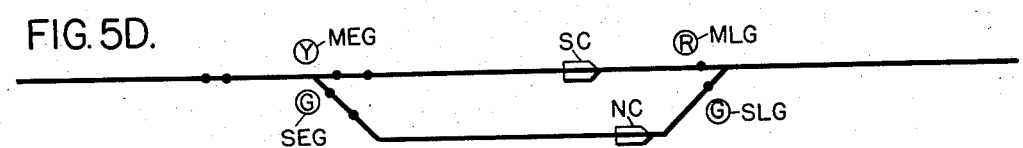
Figure 5E:
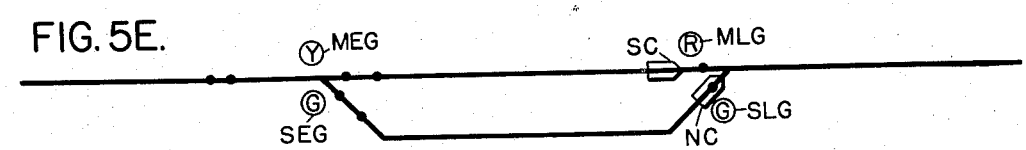
Figure 5F:
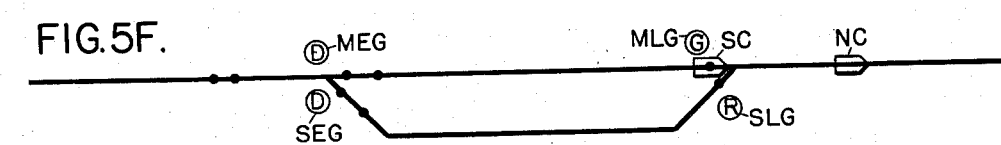

In Fig. 5D both the slow-speed car SC and the normal-speed car NC are shown at intermediate points in the dual lane location, no change occurring in the aspects displayed by the signals.

As the normal-speed car leaves the siding (see Fig. 5E) and passes over the leaving detector SLD no change occurs in the apsects displayed by the signals. However, when the normal-speed car NC leaves the dual lane location (see Fig. 5F) the timing device associated with the main leaving signal MLG is allowed to operate, resulting in the ultimate clearing of the signal MLG. The slow-speed car is allowed to leave the main and pass over the main leaving detector MLD causing the entrance signals MEG and SEG to revert to displaying dark aspects, the speed description stored in the circuit network being cancelled.

Figure 5G:
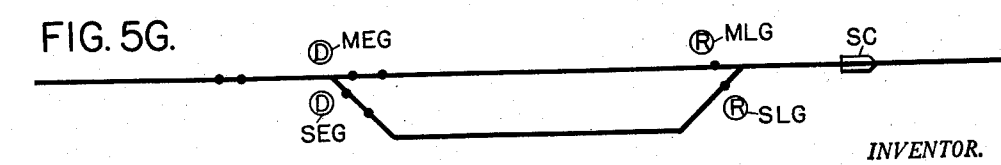

In Fig. 5G the slow-speed car is shown after leaving the dual lane location, the signals having returned to the normal condition.

Having described a dual lane location and the mode of operation of the various signals and detection devices, a specific description of the circuit network associated with the dual lane location and the various signals and detection devices can be given.

In the circuit drawings of Figs. 6A–6D, the various detection devices are shown in block form, specific regard being given only to the contacts associated with each detection device. Since it is assumed that the detection devices are of the self-restoring treadle type, the detector contacts are shown normally open; and the assumption is made that such contacts are closed only at times when cars are on the detection devices.

*Speed detection*

As the wheels of cars pass over the detector ASD1, a detection relay AD is alternately energized and deenergized in response to successive closings and openings of a contact 1 of the detector ASD1. In other words, the relay AD is energized whenever the wheels of a car are on the detector ASD1 and is deenergized whenever the detector is unoccupied.

When the relay AD is energized, a detection repeater relay ADP is energized by a pick-up circuit including a front contact 2 of relay AD. The relay ADP is made slow-acting by the connection of a resistor and a capacitor 3 in parallel with the relay winding ADP. It is intended that the relay ADP be energized when the first car in a group passes over the detector ASD1 and deenergized after the last car in the group passes the detector. In this manner, a successive energization and deenergization of the relay ADP indicates the passage of a distinct group of cars; and a subsequent energization of the relay indicates the arrival of another group of cars. Thus, the slow-acting characteristics of the relay ADP must be such that the minimum release time of the relay must be longer than the time intervals between successive occupancies of the detector ASD1 by the wheels of the cars in a group. The maximum release time of the relay ADP must be less than the time interval between the passing of the detector ASD1 by the last car in one group and the arrival on the detector by the first car in a following group if the relay ADP is to detect two separate groups of cars. In other words, the circuit constants affecting the release time of relay ADP are determined by speed and distance considerations for a given highway.

To detect the speed of a car and to store a speed description for the car, two speed detection relays ND and FD are provided along with three speed description relays S, N, and F. The normal-speed detection relay ND is normally energized by a pick-up circuit including a back contact 4 of relay ADP; and the relay ND is made slow-acting by a resistor and a capacitor 5 connected in parallel with the relay winding ND. The fast-speed detection relay FD is normally energized by a pick-up circuit including a back contact 6 of relay ADP; and the relay FD is made slow-acting by a resistor and a capacitor 7 connected in parallel with the relay winding FD. The slow-speed description relay S is energized by a pick-up circuit extending from (+), including a contact 8 of the detector ASD2, a back contact 9 of relay ND, a back contact 10 of relay FD, the relay winding S, a back contact 11 of relay N, and a back contact 12 of relay F, to (—). An alternate pick-up circuit for the relay S extends from (+), including contact 8 of detector ASD2, a back contact 13 of relay ADP, a front contact 14 of relay ND, a front contact 15 of relay FD, the relay winding S, the back contact 11 of relay N, and the back contact 12 of relay F, to (—). The normal-speed description relay N is energized by a pick-up circuit extending from (+), including a contact 16 of detector ASD2, a front contact 17 of relay ND, a back contact 18 of relay FD, a back contact 19 of relay S, the relay winding N, and a back contact 20 of relay F, to (—). The fast-speed description relay F is energized by a pick-up circuit extending from (+), including a contact 21 of detector ASD2, a front contact 22 of relay ADP, a front contact 23 of relay ND, a front contact 24 of relay FD, a back contact 25 of relay S, a back contact 26 of relay N, and the relay winding F, to (—).

It can be seen from the preceding circuit description that in order to energize one of the speed description relays S, N or F, a car must occupy the detector ASD2. A selection is made with regard to which relay S, N or F is to be energized, the selection being dependent upon the state of the detection relays ND and FD (i. e. whether the relays ND and FD are energized or deenergized) at the time when the car occupies the detector ASD2. In order to specifically select one of the relays S, N or F, the release time of the relay ND must be longer than the release time of the relay FD; and the release time of the relay ADP must be greater than that of either relay ND or FD.

More specifically, when a fast-speed car passes over the detector ASD1, the relay ADP is energized, the back contacts 4 and 6 of relay ADP opening the pick-up circuits for the speed detection relays ND and FD, respectively. When the fast-speed car occupies the detector ASD2, the pick-up circuit for the fast speed detector FD must be closed. For this to be true, the front contacts 22, 23 and 24 of relays ADP, ND and FD, respectively, must be closed. Thus, the release times of the relays ADP, ND and FD must be greater than the time required for a fast-speed car to travel from the detector ASD1 to the detector ASD2. Once energized, the relay F is held energized by a stick circuit extending from (+), including a front contact 27 of relay ADP, a front contact 28 of relay F, and the relay winding F, to (—). Since the release time of the relay ADP determines the identification of separate groups of cars, any following cars occupying the detector ASD1 before the relay ADP releases its armature are identified as parts of a group including the fast-speed car described by the relay F.

When a normal-speed car passes the detector ASD1 and arrives on the detector ASD2, the pick-up circuit for the speed description relay N must be closed. For this to occur, front contact 17 of relay ND and back contact 18 of relay FD must already be closed when the car occupies the detector ASD2. Thus, the time required for a normal-speed car to travel from the detector ASD1 to the detector ASD2 must be less than the release time of the relay ND and greater than the release time of the relay FD. Once energized, the relay N is held energized by a stick circuit extending from (+), including a front contact 29 of relay ADP, a front contact 30 of relay N, the relay winding N, and back contact 20 of relay F, to (—). Any following cars arriving on the detector ASD1 within the release time of the relay ADP are identified as parts of a group including the normal-speed car described by the relay N.

When a slow-speed car passes the detector ASD1 and arrives on the detector ASD2, the pick-up circuit for the speed description relay S must be closed. Under normal conditions, the relay S is energized by the pick-up circuit including a back contact 9 of relay ND and back contact 10 of relay FD. Thus, the time required for a slow-speed car to travel from detector ASD1 to detector ASD2 must be greater than the release times of either relay ND or FD. If, however, the distance between the detectors is greater than the length of a car and a slow-speed car should either stop between the detectors or cover the distance at an abnormally slow speed, the time of transit of the car might exceed the release time of the relay ADP. Thus, the relay ADP could become deenergized; and the relays ND and FD could become energized by the closing of back contacts 4 and 6, respectively, of relay ADP.

Under such conditions, the relay S is energized by the alternate pick-up circuit including back contact 13 of relay ADP and front contacts 14 and 15 of relays ND and FD, respectively. Once energized, the relay S is held energized by a stick circuit extending from (+), including either a back contact 31 of relay AD or a front contact 32 of relay ADP, a front contact 33 of relay S, the relay winding S, back contact 11 of relay N, and back contact 12 of relay F, to (—).

Since under normal conditions, the relay S is held energized by the stick circuit including front contact 32 of relay ADP, any following cars arriving on the detector ASD1 within the release time of the relay ADP are identified as parts of a group including the slow-speed car described by the relay S. Under the abnormal conditions previously described, whereby a car either stops or travels very slowly between the detectors ASD1 and ASD2, the transit time of the car exceeding the release time of the relay ADP, the relay S, once energized, is held energized by a stick circuit including the back contact 31 of relay AD. Under these conditions, the subsequent arrival of another car on the detector ASD1 causes the deenergization of the relay S by the opening of back contact 31 of relay AD in the stick circuit, the second car causing its own speed description to be established.

The contact 16 of detector ASD2 is assumed to be slow-acting to the extent that, once closed, it does not reopen for a time interval equal to the crossover time of the relay FD (i. e., the time between the opening of the front contacts and the closing of the back contacts of the relay). The purpose of the slow-acting feature is to insure the establishment of a speed description for a car travelling at a critical speed which is at the borderline between the normal and fast speed categories. Should such a car pass over the detector ASD2 at a time when the relay FD is dropping away its armature, the pick-up circuits for the relays F and N are both open because front contact 24 of relay FD is open in the pick-up circuit for relay F and back contact 18 of relay FD is not yet closed in the pick-up circuit for relay N. Thus, contact 16 of detector ASD2 must remain closed until back contact 18 of relay FD closes to energize relay N; otherwise, the passage of the front wheels of the car over the detector ASD2 might fail to establish a normal-speed description.

Similarly, the contact 8 of detector ASD2 is slow-acting to bridge the crossover time of the relay ND. In this instance, a car travelling at a critical speed which is at the borderline between the slow and normal speed categories is assured of establishing a slow-speed description by causing the energization of relay S.

To prevent the energization of more than one speed description relay at a time, the pick-up circuits for each of the relays S, N and F include back contacts of the other two relays. For example, when relay S is energized, its two back contacts 19 and 25 open the pick-up circuits for relays N and F, respectively.

*Initial storage of speed descriptions*

As previously described, a speed description indicated by the energization of one of the relays S, N or F is assumed by the circuit network when a car, or group of cars, passes over the detectors ASD1 and ASD2. It is intended that once a speed description is established for a car or group of cars, the description is to be maintained in the circuit network until the car (or cars) leaves the dual lane location. It is further intended that provisions be made for the storage of speed descriptions for more than one group of cars. This is considered desirable for any highway in which the distance between the detector ASD2 and the dual lane location may be large in comparison to the length of the dual lane location. In other words, on some highways several groups of cars may be contained in the stretch of highway between the detector ASD2 and the dual lane location; and a separate speed description is stored for each group of cars.

In order to provide for the storage of a plurality of speed descriptions for groups of cars approaching the dual lane location, relays S1, N1 and F1 are provided for one description storage while relays S2, N2 and F2 are provided for another description storage. The relays S1, N1 and F1 are, in effect, repeaters of the relays S, N and F, respectively; and the relays S2, N2 and F2 are, in effect, repeaters of the relays S1, N1 and F1, respectively. Speed descriptions are passed from one relay group to the next by a circuit means to be described.

A relay SNF is provided to indicate that a speed description is assumed for a group of cars and that the description is ready to be transferred to the first bank of description relays S1, N1 and F1.

A slow-acting description stick relay DS is provided to indicate that a speed description is completely transferred to the relays S1, N1 and F1.

A relay SNFS is provided to indicate that a speed description is available for transfer and that the transfer is initiated. The relay SNFS also functions to preclude repeated transfers of the same speed description for one group of cars.

A transfer relay TN1 is provided to accept the transfer of a description to the first bank of description relays S1, N1 and F1 only when no description is already stored in those relays.

A slow-acting description stick relay DS1 is provided to accept a speed description transferred to the first bank of description relays S1, N1 and F1 and to hold the description stored in those relays until it can be transferred to the second bank of description relays S2, N2 and F2. The relay DS1 also functions to initiate the transfer of a speed description from the relays S1, N1 and F1 to the relays S2, N2 and F2, respectively.

Another transfer relay TN2 and another slow-acting description stick relay DS2 are provided to function in the manner described for the relays TN1 and DS1 respectively, the relays TN2 and DS2 being associated with the transfer and holding of speed descriptions applied to the relays S2, N2 and F2.

More specifically, assume that the relay S is energized by the detection of a slow-speed car passing over the detectors ASD1 and ASD2. The relay SNF is energized by a pick-up circuit extending from (+), including a back contact 34 of relay TN1, a back contact 35 of relay SNFS, a front contact 36 of relay S, and the relay winding SNF, to (—). It is obvious from the circuit diagram that front contacts 37 and 38 of relays N and F, respectively, connected in parallel with front contact 36 of relay S provide for the energization of the relay SNF whenever any of the speed ranges are detected for a car. Once energized, the relay SNF is held energized by a stick circuit extending from (+), including a front contact 39 of relay DS, a front contact 40 of relay SNF, and the relay winding SNF, to (—).

The energization of the relay SNF results in the subsequent energization of the relays SNFS and TN1.

Relay SNFS is energized by a pick-up circuit extending from (+), including a front contact 41 of relay S, a front contact 42 of relay SNF, and the relay winding SNFS, to (—). A stick contact 43 of relay SNFS closes to maintain energization of relay SNFS as long as front contact 41 of relay S is closed. The back contact 35 of relay SNFS opens the pick-up circuit for relay SNF and holds that pick-up circuit open as long as the relay SNFS is energized, the relay SNF remaining energized through its stick circuit. It is obvious that the relay SNFS can be energized in a similar manner by either a front contact 44 of relay N or a front contact 45 of relay F, the front contacts 44 and 45 being connected in parallel with front contact 41 of relay S.

The relay TN1 is energized by a pick-up circuit extending from (+), including a front contact 46 of relay SNF, a back contact 47 of relay DS1 and the relay winding TN1, to (—), a front contact 48 of relay TN1 closing a stick circuit for that relay.

The relay DS1 is then energized by a pick-up circuit extending from (+), including a front contact 49 of relay TN1, a back contact 50 of relay TN2, and the relay winding DS1, to (—). A front contact 51 of relay DS1 closes one stick circuit for relay DS1, while a front contact 52 of relay DS1 closes a second stick circuit which includes a back contact 53 of relay DS2. At this time, the normally energized relay DS is deenergized by the opening of the back contacts 54 and 55 of relays TN1 and DS1, respectively. However, since the relay DS is slow-acting, its front contacts remain closed long enough to allow the energization of the slow-speed description relay S1 by a pick-up circuit extending from (+), including front contact 56 of relay S, a front contact 57 of relay SNF, a front contact 58 of relay SNFS, a front contact 59 of relay DS, a front contact 60 of relay TN1, a front contact 61 of relay DS1, and the relay winding S1, to (—). A front contact 62 of relay S1 closes a stick circuit for the relay S1 including a front contact 63 of relay DS1. The transfer of a slow-speed description from relay S to relay S1 is now completed; and it is obvious from the circuit diagram that similar pick-up and stick circuits are provided for relays N1 and F1 to allow similar transfers of normal-speed and fast-speed descriptions.

When the slow-acting relay DS releases its armature the relay SNF is deenergized by the opening of front contact 39 of relay DS in the stick circuit of relay SNF. The pick-up circuit for relay S1 is opened simultaneously by front contact 59 of relay DS; but relay S1 remains energized through its stick circuit. The deenergization of relay SNF results in the deenergization of relay TN1 by the opening of front contact 46 of relay SNF in the stick circuit of relay TN1, the pick-up circuit of relay TN1 being already opened by back contact 47 of relay DS1. The opening of front contact 42 of relay SNF makes relay SNFS dependent upon its stick circuit for energization; and relay SNFS remains energized until relay S is deenergized.

The deenergization of relay TN1 causes the energization of relay DS by the closing of back contact 54 of relay TN1.

When the relay S becomes deenergized, the stick circuit energizing relay SNFS opens and the circuits described resume the normal conditions except for the continued energization of relays DS1 and S1.

If another speed description is now assumed by the relays S, N and F, the relays SNF and SNFS are energized as previously described. However, the speed description cannot be transferred into the first bank of relays S1, N1 and F1 because the pick-up circuit for the transfer relay TN1 remains opened by back contact 47 of relay DS1. Thus, the storage of more than one speed description in the bank of relays S1, N1 and F1 is impossible.

Returning now to the slow-speed description stored by the relay S1, when relay TN1 becomes deenergized the relay TN2 is energized by a pick-up circuit extending from (+), including a back contact 64 of relay TN1, a front contact 65 of relay DS1, a back contact 66 of relay DS2, and the relay winding TN2, to (−), a stick circuit for relay TN2 being closed by a front contact 67 of relay TN2. The back contact 50 of relay TN2 opens one of the two stick circuits for relay DS1.

Relay DS2 is now energized (see Figs. 6A and 6B) by a pick-up circuit extending from (+), including a front contact 68 of relay TN2, a wire 69, a front contact 70 of a relay SBP, a front contact 71 of a relay MBP, a wire 72, and the relay winding DS2, to (−). A front contact 73 of relay DS2 in parallel with front contact 68 of relay TN2 closes to establish a stick circuit for relay DS2. Back contact 53 of relay DS2 opens the effective stick circuit for relay DS1. However, the slow-acting characteristics of relay DS1 prevent the opening of its front contacts 63 and 65 which, respectively, are maintaining the energization of relays S1 and TN2. Thus, the slow-speed description is transferred from relay S1 to relay S2 upon the energization of relay S2 by a pick-up circuit extending from (+), including front contact 74 of relay S1, front contact 75 of relay TN2, a front contact 76 of relay DS2 and the relay winding S2, to (−). A stick circuit for relay S2 which includes front contact 77 of relay S2 and front contact 78 of relay DS2 is closed.

When the slow-acting relay DS1 does release its armature, relay S1 is deenergized by the opening of its stick circuit by front contact 63 of relay DS1. Relay TN2 also is deenergized by the opening of front contact 65 of relay DS1.

The slow-speed description is now stored by relay S2 in the second bank of speed description relays. It is obvious from the circuit diagram that a normal-speed or a fast-speed description can be transferred from relay N1 or F1 to relay N2 or F2, respectively, by circuits similar to that described for the transfer from relay S1 to relay S2.

At this time, another speed description can be transferred into the first bank of description relays S1, N1 and F1 because the pick-up circuit for relay TN1 is closed by back contact 47 of relay DS1. It is relevant to note that back contact 66 of relay DS2 in the pick-up circuit for relay TN2 functions in the same manner as back contact 47 of relay DS1 functions in the pick-up circuit of relay TN2, both contacts preventing the transfer of a speed description into a bank of relays already storing a description.

No further transfer of the slow-speed description occurs until the first car in the group identified by the description enters either the main or the siding in the dual lane location.

*Storage, transfer and utilization of speed descriptions for the control of entrance signals*

The utilization of speed description storages for the control of the entrance signals MEG and SEG at the dual lane location can be described in view of the preceding description of speed detection means and the means for the initial storages and transfers of speed descriptions.

Figure 6A:
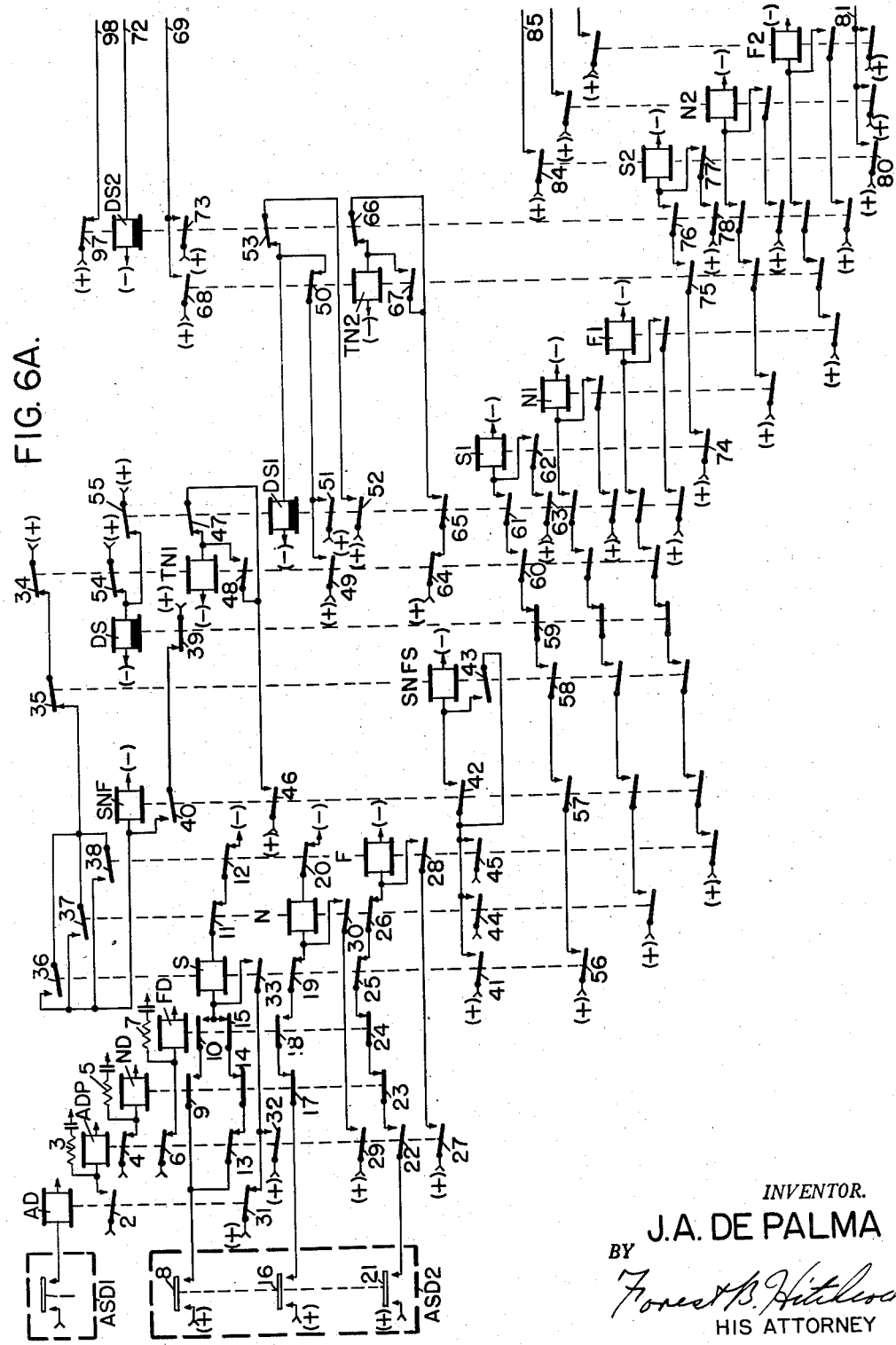
Figure 6B:
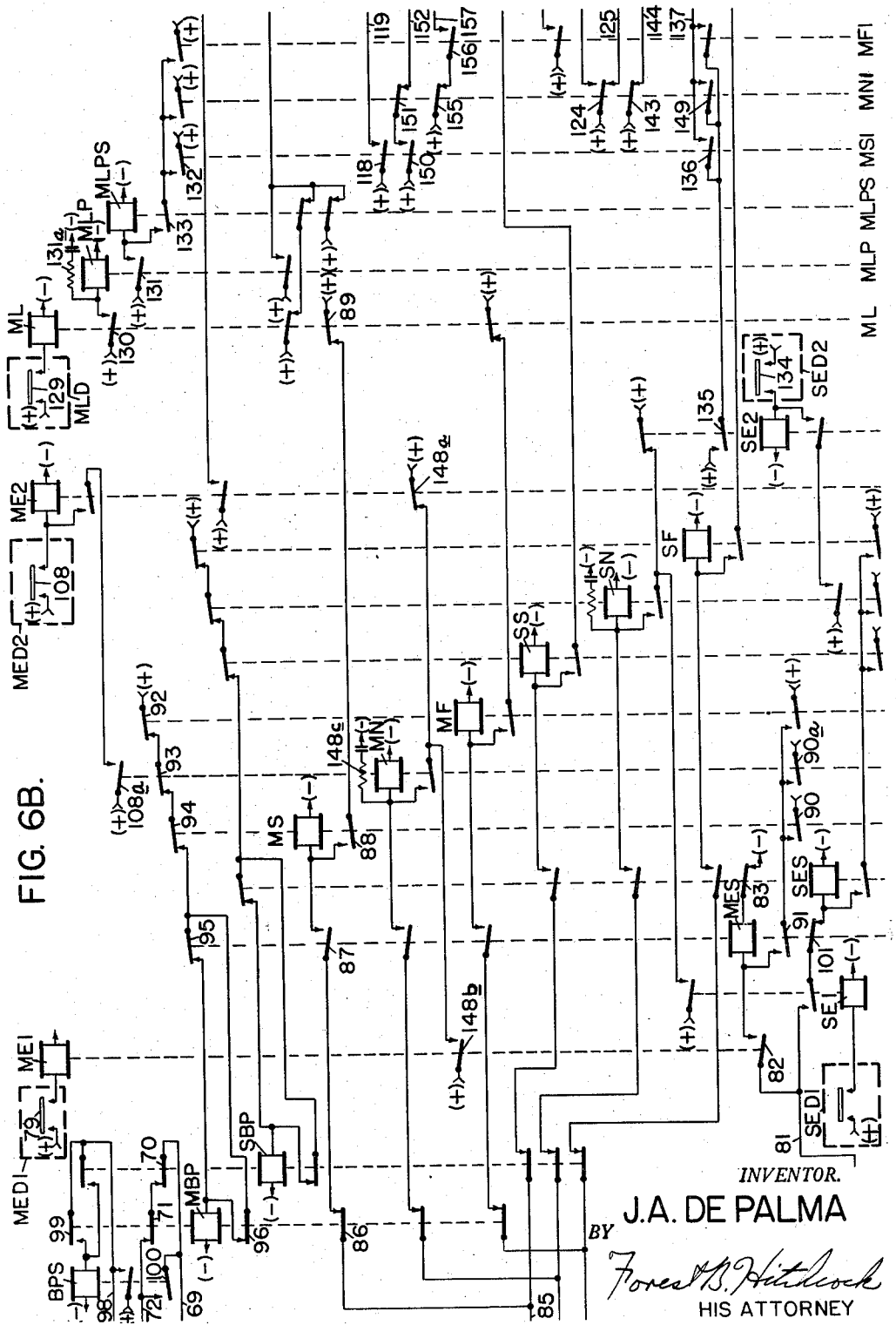

Referring now to Fig. 6B, two detection relays ME1 and SE1 are provided to indicate the passage of cars entering the main and the siding, respectively. The relays ME1 and SE1 repeat operations of the entrance detectors MED1 and SED1, respectively, in response to the passage of traffic.

A bank of three speed description relays MS, MN and MF is provided to store speed information associated with a group of cars when the first car in the group chooses to enter the main. A similar bank of relays SS, SN and SF is provided to store speed information when the first car in a group chooses to enter the siding. Only one of the two banks of relays can store a speed description at any given time, each bank functioning, in effect, as a repeater of the bank of speed description relays S2, N2 and F2.

Two entrance stick relays MES and SES are provided, the relays being associated with the main and the siding respectively. The relay MES functions in response to the entrance of a car into the main and serves to transfer speed descriptions into the bank of relays MS, MN and MF, the relay MES then indicating the storage of a speed description in that bank of relays. The relay SES functions in an identical manner for a car entering the siding. Only one of the relays MES and SES can be operative at one time.

Two back repeater relays MBP and SBP are provided to indicate the storage of a speed description in the relay banks associated with the main and the siding, respectively. The relay MBP is, in effect, a back contact repeater of the speed description relays MS, MN and MF, while the relay SBP repeats the relays SS, SN and SF.

A back repeater stick relay BPS is provided as an inverse repeater of the relays MBP and SBP. The relay BPS functions to allow the storage of a speed description in the bank of relays S2, N2 and F2 after a previous description is transferred out of that bank of relays.

More specifically, assume that the slow-speed description previously described is stored in the relay S2, the relays S2 and DS2 being energized by their respective stick circuits. Assume also that the first car in the group identified by the slow-speed description chooses to enter the main at the dual lane location.

When the first car occupies the main entrance detector MED1, the relay ME1 is energized by the closing of a contact 79 of detector MED1.

The relay MES is then energized by a pick-up circuit (see Figs. 6A and 6B) extending from (+), including a front contact 80 of relay S2, a wire 81, a front contact 82 of relay ME1, the relay winding MES, and a back contact 83 of relay SES, to (−).

Upon the energization of relay MES, relay MS becomes energized by a pick-up circuit extending from (+), including a front contact 84 of relay S2, a wire 85, a front contact 86 of relay MBP, a front contact 87 of relay MES, and the relay winding MS, to (−). A stick circuit is closed for the relay MS by a front contact 88 of relay MS, the stick circuit also including a back contact 89 of a relay ML which operates in response to cars leaving the main. The relay MES is now also held energized by a stick circuit including a front contact 90 of relay MS, and a front contact 91 of relay MES.

When relay MS becomes energized, indicating the storage of a slow-speed description for a car travelling through the main, the main back repeater relay MBP is deenergized. The relay MBP is normally energized by a pick-up circuit extending from (+), including a back contact 92 of relay MF, a back contact 93 of relay MN, a back contact 94 of relay MS, a back contact 95 of relay MES, and the relay winding MBP, to (−). A stick contact 96 of relay MBP is connected in parallel with back contact 95 of relay MES to prevent operations of relay MBP in response to operations of relay MES caused by the passage of cars over the detector MED1 at times when no speed description is stored for the main (i. e. whenever the detector MED1 is actuated by cars using the main to pass a first car travelling over the siding).

The relay DS2 is then deenergized by the opening of front contact 71 of relay MBP in the pick-up and stick circuits of relay DS2, resulting in the deenergization of relay S2 by the opening of front contact 78 of relay DS2 in the stick circuit for relay S2.

In this way, the slow-speed description is completely transferred from the relay bank including the relay S2 to the relay MS, the transfer being effected by the entering of the first car in the group into the main. It is obvious from the circuit diagram that similar transfers can be made from relay N2 to relay MN and from relay F2 to relay MF for normal-speed and fast-speed descriptions, respectively. Furthermore, it is obvious that similar transfers can be effected from the bank of relays S2, N2 and F2 to the bank of relays SS, SN and SF if the first car chooses to enter the siding instead of the main.

Relay BPS is now energized by a pick-up circuit extending from (+), including a back contact 97 of relay DS2, a wire 98, a back contact 99 of relay MBP, and the relay winding BPS, to (−). The closing of a front contact 100 of relay BPS establishes a pickup circuit for relay DS2, front contact 100 of relay BPS being connected in parallel with the series connected contacts 70 and 71 of relays SBP and MBP, respectively. Another speed description can now be transferred to and stored in the bank of relays S2, N2 and F2.

If a following speed description be transferred into the bank of relays S2, N2 and F2, the description cannot be transferred further by the action of the preceding group of cars. For example, the deenergized state of relay MBP is maintained as long as a speed description is stored by relay MS (or relays MN and MF) for the slow-speed car previously described. Since front contact 86 of relay MBP must be closed for the picking up of relay MS, and since similar front contacts of relay MBP exist in the pick-up circuits for relays MN and MF, the second storage cannot be transferred into the relay bank including those relays. On the other hand, any cars belonging to the first group described which are passing through the siding and are actuating detector SED1 and relay SE1 cannot establish pick-up circuits for the relays SS, SN and SF. This is true because the pick-up circuits for the relays SS, SN and SF include front contacts of relay SES; and relay SES is held deenergized by an open back contact 101 of relay MES.

Thus, only one speed description can be stored at one time by the relays associated with the entering ends of the main and the siding.

Figure 6D:
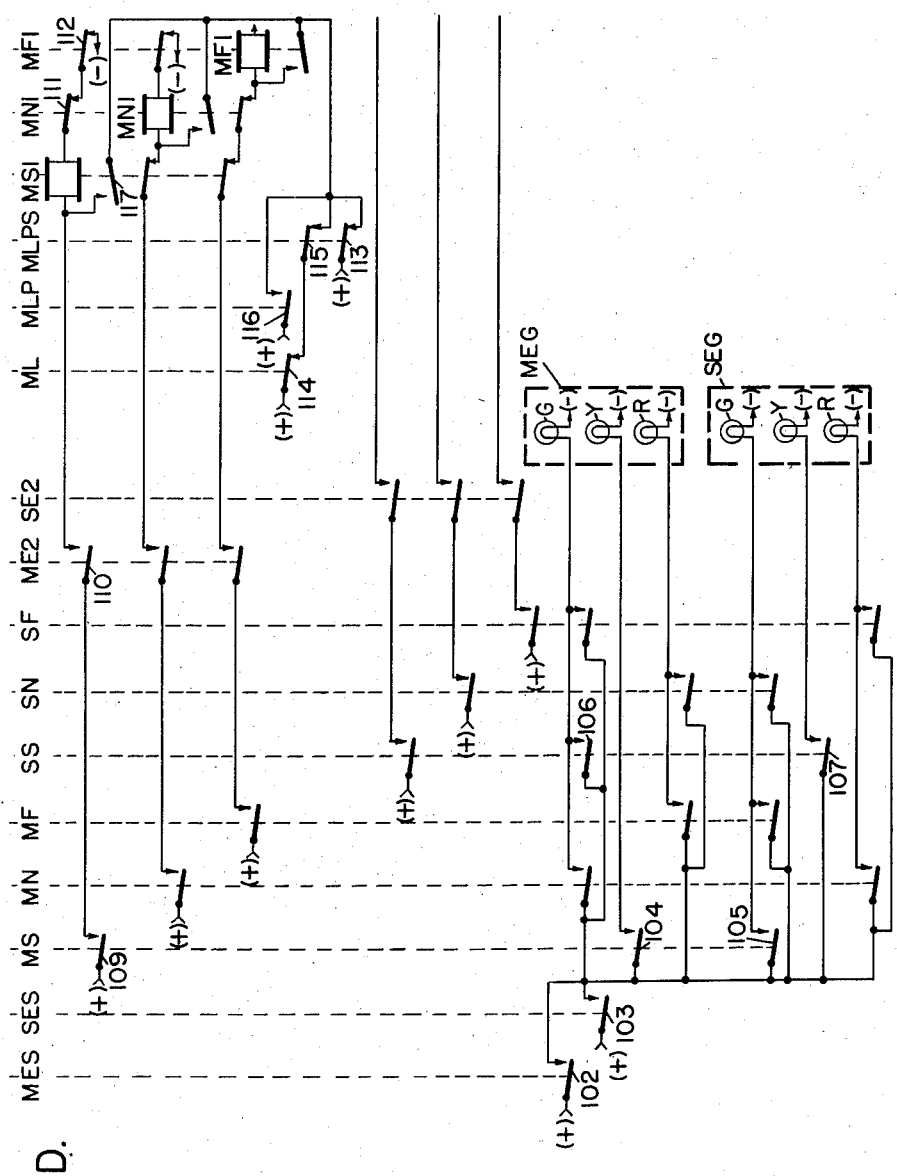
Figure 7:
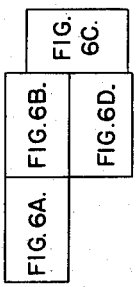

Referring to Fig. 6D, the entrance signals MEG and SEG for the main and the siding, respectively, are each shown to include lamps for displaying red R, yellow Y and green G aspects.

Inspection of the control circuits for the signals shows that each lamp is energized by a circuit including either one front contact of a speed description relay MS, MN, MF, SS, SN and SF or a parallel connection of a combination of front contacts of the various speed description relays. Furthermore, the circuits energizing the various lamps all include a front contact 102 of relay MES connected in parallel with a front contact 103 of relay SES. In view of the preceding description of relay operation, it follows that the lamps are all dark until a car passes over one of the entrance detectors MED1 and SED1 to energize either relay MES or relay SES along with one of the description relays in the bank of relays associated with either relay MES or SES. Since relay MES is held energized as long as one of the description relays MS, MN and MF is energized, any resultant signal aspect is displayed until the stored speed description is transferred from that bank of relays; and a similar description applies to relay SES in conjunction with relays SS, SN and SF.

More specifically, when the slow-speed car previously described approaches the dual lane location, the signals MEG and SEG are dark, indicating that the car may enter either the main or the siding. Assuming as before that the car enters the main, the relays MES and MS are energized. The yellow Y lamp of signal MEG is energized by a circuit extending from (+), including front contact 102 of relay MES, a front contact 104 of relay MS, and the lamp Y, to (−). The green G lamp of signal SEG is energized by a circuit extending from (+), including front contact 102 of relay MES, a front contact 105 of relay MS and the lamp G, to (−). Any following cars in the group including the slow-speed car are directed by the signals either to pass the slow-speed car by taking a route over the siding or to choose to follow the slow-speed car. In the latter case, a warning is implied that a time penalty is forthcoming at the leaving end of the main. If the slow-speed car were to choose to enter the riding rather than the main, the green G lamp signal MEG and the yellow Y lamp of signal SEG would be lighted by the closing of front contacts 106 and 107, respectively, of relay SS in conjunction with the closing of front contact 103 of relay SES.

From the circuit diagram, it can be seen that a normal-speed car entering the main causes the green G lamp of signal MEG and the red R lamp of signal SEG to be lighted the aspects being the reverse for the two signals if the normal-speed car enters the siding instead of the main. Following cars in the group are then directed to follow the normal-speed car. Similarly, a fast-speed car entering the main causes the red lamp R of signal MEG and the green G lamp of signal SEG to be lighted, the aspects being the reverse for the two signals if the fast-speed car enters the siding instead of the main. Following cars are then directed to pass the fast-speed car in the alternate lane to avoid a signalling penalty which is to be applied to the fast-speed car at the leaving end of the dual lane locations.

The entrance signals MEG and SEG remain lighted until a speed description stored in either the bank of relays MS, MN and MF or the bank of relays SS, SN and SF is caused to be removed from those relays.

In the case of a slow-speed car or a fast-speed car the signals MEG and SEG remain lighted until the slow-speed or fast-speed car passes over the leaving detector MLD or SLD. For example (see Fig. 6B), the arrival of a slow-speed car on the main leaving detector MLD causes relay MS to be denergized as the result of back contact 89 of relay ML opening in the stick circuit for relay MS. A slow-speed car or a fast-speed car cannot, however, pass over detector MLD or SLD unless signal MLG or SLG, respectively, displays a green aspect. Since signaling penalties are applied in a manner to be described against slow-speed and fast-speed cars by signals MLG and SLG so that following cars in a group are permitted to pas the slow-speed or fast-speed cars, it is evident that signals MEG and SEG must remain lighted to direct such following cars into the passing lane at the dual lane location. A different situation exists in the case of a normal-speed car, however. If a normal-speed car is detected and chooses to enter the main, relay MN is energized in a manner similar to that described for the energization of relay MS, signals MEG and SEG being caused to display green and red indications, respectively. Relay MN, once energized, is held energized by a stick circuit including a parallel connection of a front contact 148b of relay ME1 and back contact 148a of relay ME2. Furthermore, relay MN is made slow-acting by the connection of a resistor and a capacitor 148c in parallel with the relay windings MN. If a lone normal-speed car enters the main and passes over entrance detector MED2, contact 108 of detector MED2 closes to energize relay ME2. Relay ME2 is then held energized by a stick circuit including a front contact 108a of relay MN. The opening of back contact 148a of relay ME2 deenergizes relay MN; and front contact 108a of relay MN opens in the stick circuit for relay ME2 when relay MN releases its armature. If a normal-speed car is followed into the main by other cars, however, relay MN is held energized by its stick circuit as long as cars continue to pass over detector MED1 causing intermittent closings of front contact 148b of relay ME1. The slow-acting characteristics given to relay MN serve to maintain the stick circuit for relay MN between successive applications of energy by front contact 148b of relay ME1. In any case, relay MN is ultimately deenergized when the last car in a group of normal-speed cars passes over detector MED2. Since detected normal-speed cars escape signaling penalties and are allowed to pass through a dual lane location without stopping, it is evident that the stick circuit for relay MN should be dependent upon operations of the main entrance detectors MED1 and MED2 rather than the main leaving detector MLD. In other words, if a long line of normal-speed cars passes through the main, signals MEG and SEG should continue to display green and red aspects, respectively, until the last car enters the main. If the passage of the first car in the line of cars over the main leaving detector MLD were to cause relay MN to be deenergized as in the case described for relays MS and MF, signals MEG and SEG would revert to displaying dark aspects which would, in turn, permit following cars in the group to enter either lane; and a penalty would be applied against such cars entering the siding. Thus, relay MN is held energized for the duration of the passage of a distinct group of normal-speed cars into the main.

It can be further noted that the deenergization of relay MN by the passage of the last car in a group of normal-speed cars results in the deenergization of relay MES and the subsequent energization of relay MBP, relay MES being deenergized by the opening of a front contact 90a of relay MN in the stick circuit for relay MES, relay MBP being energized by the closing of back contacts 93 and 95 of relays MN and MES, respectively. Back contact 101 of relay MES closes to precondition the pick-up circuit for relay SES. Thus, the circuit network is aligned to permit the transfer of a subsequent speed description for another detected group of cars into either the bank of relays MS, MN and MF or the bank of relays SS, SN and SF.

Since a similar circuit network is provided for the siding, the choice of the siding route by a car (or the first car in a group) results in similar circuit operations; and the resultant aspects displayed by signals MEG and SEG are opposite to those described above for a car choosing to enter the main.

*Transfer, storage and utilization of speed descriptions for the control of leaving signals*

In order to control the main leaving signal MLG and the siding leaving signal SLG in accordance with the traffic speeds detected on the approach to the dual lane location, speed descriptions are transferred to banks of description relays associated with the leaving ends of the main and the siding.

Relays MS1, MN1 and MF1 are provided to repeat descriptions stored in the relays MS, MN and MF, respectively, when the first car in a group enters the main and passes over the detector MED2, a relay ME2 being provided to repeat operations of the detector MED2. Similarly, relays SS1, SN1 and SF1 are provided to repeat descriptions stored in the relays SS, SN and SF, respectively, when the first car in a group enters the siding and passes over the detector SED2, a relay SE2 being provided to repeat operations of the detector SED2.

A time element relay MSTE is provided to introduce a timing factor into the control circuit for the leaving signal MLG whenever that signal is to govern the departure of a slow-speed car. It is assumed that the predetermined time interval measured by the relay MSTE is such that a single slow-speed car travelling through the main is not penalized by having to stop for a time before being allowed to pass the signal MLG. A repeater relay MSTEP indicates the completion of the timing action by the relay MSTE. A similar time element relay SSTE and a repeater relay SSTEP are provided to introduce a timing factor into the control circuit for the leaving signal SLG.

Another time element relay MFTE and a repeater MFTEP are provided to introduce a timing factor into the control circuit for the signal MLG whenever that signal is to govern the departure of a fast-speed car. It is assumed that the predetermined time interval measured by the relay MFTE is such that a fast-speed car travelling through the main is forced to stop for a time before being allowed to depart from the main. The time interval is assumed to be long enough to hold the average speed of a normally fast-speed car down to a value within the normal speed range for the highway. Similarly, a time element relay SFTE and a repeater relay SFTEP are provided to impose signalling penalties upon fast-speed cars travelling over the siding.

Two detection relays ML and SL are provided to repeat operations of the main leaving detector MLD and the siding leaving detector SLD, respectively. Two slow-acting repeater relays MLP and SLP are provided to repeat the relays ML and SL, respectively, the slow-acting characteristics being necessary for reasons previously described for relay ADP.

Two leaving repeater stick relays MLPS and SLPS are provided to function as qualified repeaters of relays MLP and SLP, respectively. The relays MLPS and SLPS serve to indicate the departure of a car or cars and the storage of a speed description for those cars.

A main leaving stick relay MLS is provided to detect cars travelling through the main for the purpose of passing slow or fast cars travelling through the siding. The relay MLS also functions to suspend timing operations initiated for the slow-speed cars or fast-speed cars travelling through the siding. A main leaving stick repeater relay MLSP is provided to repeat relay MLS provided that no normal-speed description is stored for any cars on the siding, the relay MLSP controlling the leaving signal MLG to display a proceed aspect for cars travelling through the main to pass other cars on the siding. Relays SLS and SLSP are provided to duplicate the functions described for relays MLS and MLSP, respectively, when cars are using the siding to pass slow-speed cars or fast-speed cars travelling through the main.

Assume now that a slow-speed description is stored in relay MS for a slow-speed car travelling through the main. The relay MS is energized by its stick circuit; and the stick circuit is effective until the car occupies the main leaving detector MLD causing back contact 89 of relay ML to open.

Assuming for the moment that the slow-speed car is alone (i. e. the car is not the first in a group of cars), the arrival of the car on detector MED2 (see Figs. 6B—6D) causes relay ME2 to be energized by the closing of a contact 108 of detector MED2. The energization of relay ME2 causes the subsequent energization of relay MS1 and the time element relay MSTE.

Relay MS1 is energized by a pick-up circuit (see Fig. 6D) extending from (+), including a front contact 109 of relay MS, a front contact 110 of relay ME2, the relay winding MS1, a back contact 111 of relay MN1, and a back contact 112 of relay MF1, to (—). Once energized, relay MS1 is held energized by a stick circuit extending from (+), including a parallel connection of a back contact 113 of relay MLPS, a back contact 114 of relay ML in series with back contact 115 of relay MLPS, and a front contact 116 of relay MLP; a front contact 117 of relay MS1, the relay winding MS1, back contact 111 of relay MN1, and back contact 112 of relay MF1, to (—).

The slow-speed time element relay MSTE is energized by a circuit (see Figs. 6B—6C) extending from (+), including a front contact 118 of relay MS1, a wire 119, a back contact 120 of relay SLS, the relay winding MSTE, and a back contact 121 of relay MSTEP, to (—). When the relay MSTE completes its timing operation the repeater relay MSTEP is energized by the closing of a front contact 122 of relay MSTE, causing relay MSTE to be deenergized by the opening of back contact 121 of relay MSTEP. Relay MSTEP is held energized by a stick circuit including front contact 118 of relay MS1, wire 119, and a front contact 123 of relay MSTEP.

Under the conditions when no cars are travelling through the dual lane location, the main leaving signal MLG and the siding leaving signal SLG display stop aspects. A red lamp R in signal MLG is energized under such conditions by a circuit extending from (+), including a back contact 124 of relay MN1, a wire 125, a back contact 126 of relay MLSP, a back contact 127 of relay MSTEP, a back contact 128 of relay MFTEP, and the lamp R, to (—). It can be seen from the circuit diagram that the various relay contacts in the energizing circuit for the lamp R are dependent front-back contacts which are connected in a manner such that the closing of any or all front contacts and the opening of any or all back contacts causes the deenergization of the red lamp R and the energization of a green lamp G. Thus, the energization of relay MSTEP causes the signal MLG to display a green aspect because back contact 127 of relay MSTEP opens and front contact 127 closes, the red lamp R being deenergized and the green lamp G being energized.

The slow-speed car can now leave the main, passing the signal MLG and passing over the main leaving detector MLD. The closing of a contact 129 of detector MLD energizes relay ML, causing relay MLP, in turn, to be energized by the closing of a front contact 130 of relay ML. A resistor and a capacitor 131a are connected in parallel with the relay winding MLP to make that relay slow-acting to the extent that the release time of the relay is long enough to bridge successive operations of relay ML in response to car wheels passing over detector MLD. The release time of relay MLP is determined by the speed, distance and car spacing characteristics for a highway. In other words, relay MLP is not allowed to release its armature until after a car or a group of cars completely passes the detector MLD.

Relay MLPS is energized upon the closing of a front contact 131 of relay MLP; and relay MLPS is then being held energized by a stick circuit including a front contact 132 of relay MS1 and a front contact 133 of relay MLPS.

Since the slow-speed description stored in relay MS1 for the slow-speed car must be eliminated after the car leaves the dual lane location, attention is given to the previously described stick circuit for relay MS1 (see Fig. 6D). When the front wheels of the car occupy detector MLD, relay ML becomes energized and back contact 114 of relay ML opens one of the stick circuits for relay MS1. Relay MLP then becomes energized closing its front contact 116 to establish another stick circuit for relay MS1; and this stick circuit holds until the slow-acting relay MLP releases its armature. Subsequently, relay MLPS becomes energized opening its back contacts 113 and 115 to render two stick circuits for relay MS1 ineffective. At this point, the continued energization of relay MS1 depends solely upon the energization of relay MLP. After the car completely passes detector MLD and the release time of relay MLP expires, front contact 116 of relay MLP opens to deenergize relay MS1. Thus, the stick circuit arrangement for relay MS1 is such that the relay is held energized until a car or group of cars completely passes detector MLD, the release time of relay MLP bridging the time intervals between successive operations of detector MLD and relay ML in response to the passage of car wheels over the detector MLD.

The deenergization of relay MS1 results in the opening of its front contact 118 to deenergize relay MSTEP. The aspect displayed by signal MLG then changes from green to red in response to the opening of front contact 127 and the closing of back contact 127 of relay MSTEP.

It is obvious from the circuit diagram that the described signal and relay operation is similar for a fast-speed car, the only difference being the time interval measured by the fast-speed time element relay MFTE. In the case of a normal-speed car, signal and relay operation is also similar except that no timing relay is required; and the signal MLG being responsive to the position assumed and by the dependent front-back contact 124 of relay MN1.

Furthermore, it is obvious that the control circuits for the siding leaving signal SLG are similar to those described for the main leaving signal MLG, signal and relay operations being similar if a car chooses to travel through the siding rather than the main.

Returning now to the conditions wherein a slow-speed car enters the main and passes over the detector MED2, assume that the car is the first car in a group and that following cars in the group choose to pass the slow-speed car by entering the siding. Under these conditions, relays MS, ME2 and MS1 are energized and held by their respective stick circuits (see Figs. 6B–6D). Signals MEG and SEG display yellow and green aspects, respectively, and the time element relay MSTE is caused to start its timing operation.

When the first of the following cars in the group passes over the siding detector SED2, relay SE2 is energized by the closing of a contact 134 of detector SED2. The siding leaving stick relay SLS is then energized by a pick-up circuit extending from (+), including a front contact 135 of relay SE2, a front contact 136 of relay MS1, a wire 137, and the relay winding SLS, to (—). Relay SLS is held energized by a stick circuit extending from (+), including a parallel connection of back contact 138 of relay SLPS, a back contact 139 of relay SL in series with a back contact 140 of relay SLPS, and a front contact 141 of relay SLP; a front contact 142 of relay SLS and the relay winding SLS, to (—). Back contact 120 of relay SLS opens the energizing circuit for relay MSTE causing the suspension of the timing operation previously described in the control circuit of signal MLG.

Relay SLSP is now energized by a pick-up circuit extending from (+), including a back contact 143 of relay MN1, a wire 144, a back contact 145 of relay MLSP, a front contact 146 of relay SLS, and the relay winding SLSP, to (—). The dependent front-back contact 147 of relay SLSP opens its back and closes its front to deenergize the red lamp R and to energize the green lamp G in signal SLG. The operation of the control circuit for signal SLG is similar to that previously described for signal MLG.

The following cars in the group are free to pass signal SLG and leave the siding. As these cars pass over the siding leaving detector SLD, relays SL, SLP and SLPS operate in the manner previously described for the relays ML, MLP and MLPS on the main; and the stick circuit for relay SLS is finally opened when the slow-acting relay SLP releases its armature after the last car passes over detector SLD. Relay SLSP is deenergized by the opening of front contact 146 of relay SLS. Signal SLG then changes its aspect from green to red when the dependent front-back contact 147 of relay SLSP opens its front contact and closes its back contact.

When relay SLS does release its armature, back contact 120 of relay SLS closes to energize the time element relay MSTE. Relay MSTE then operates as previously described causing relay MSTEP to be energized to control signal MLG to display a green aspect; and the slow-speed car is allowed to leave the main. The slow-speed car in passing over detector MLD causes relays MS, MS1 and MSTEP to be deenergized as previously described, returning the circuits and signals to the normal state.

It can be seen from the circuit diagram that the preceding description of circuit and signal operation applies similarly to cars passing a slow-speed car or a fast-speed car regardless of which lane is chosen by the slow-speed car or the fast-speed car. Further attention must be given, however, to circuit and signal operations when a group of cars is led by a normal-speed car.

In the preceding description of circuit operation, it was noted that a normal-speed car leading a group of cars and choosing to enter the main causes the entrance signals MEG and SEG to display green and red aspects, respectively. Such conditions are correct in that no following cars should be allowed to use the siding to pass a normal-speed car.

Assume that the second car, for example, in a group of normal-speed cars fails to observe the indications displayed by signals MEG and SEG after the first car chooses to enter the main. Further assume that the second car enters the siding and, in effect, attempts to pass the normal-speed car or cars travelling through the main. At this time, relay MN1 is energized and front contact 124 of relay MN1 causes energization of the green G lamp of signal MLG. When the second car enters the siding and passes over detector SED2, relay SLS is energized by a pick-up circuit previously described, but including a front contact 149 of relay MN1. Relay SLS then is held energized by its stick circuit until cars pass over the siding leaving detector SLD. Front contact 146 of relay SLS closes in the pick-up circuit for relay SLSP, but that pick-up circuit remains opened by back contact 143 of relay MN1.

As soon as the normal-speed car, or cars, travelling through the main leaves the dual lane location, relay MN1 is deenergized, closing its back contact 143 to energize relay SLSP. In signal MEG the green lamp G is deenergized and the red R lamp is energized by the respective opening of front contact 124 and closing of back contact 124 of relay MN1. In signal SEG the red lamp R is deenergized and the green lamp G is energized by the respective opening of back contact 147 and closing of front contact 147 of relay SLSP, relay SLSP remaining energized until the second car passes over detector SLD in leaving the siding.

Thus, cars attempting to pass a leading normal-speed car are restrained at the leaving end of the dual lane location until the normal-speed car (or cars) leaves the location. Circuit symmetry again is such that the choice of main or siding by the first car is immaterial insofar as signal operation is concerned.

The relays MLSP and SLSP, being vital to the control of leaving signals during passing movements, are cross-checked in that the pick-up circuits for each relay includes a back contact of the other relay. This is to preclude the possibility of simultaneous clearing of signals MLG and SLG under unusual operating conditions, such as the incidence of stray energy caused by grounds.

Signal violation detection

Whenever a car passes by a leaving signal MLG or SLG while the signal displays a red aspect, means are provided to detect and identify the offending car.

In Figs. 6B and 6C, a main violation recorder MVR is shown energized by two circuits, one of which extends from (+), including a front contact 150 of relay MS1, a back contact 151 of relay MN1, a wire 152, a back contact 153 of relay MSTEP, a contact 154 of the main violation detector MVD, and the recording device MVR, to (—); the other energizing circuit extending from (+), including a back contact 155 of relay MN1, a front contact 156 of relay MF1, a wire 157, a back contact 158 of relay MFTEP, contact 154 of detector MVD, and recording device MVR, to (—). The first energizing circuit described for recording device MVR is closed whenever a slow-speed description is stored in relay MS1 and the car associated with the description passes over detector MVD before the relay MSTEP becomes energized to open its back contact 153. Similarly, the second energizing circuit described for recording device MVR is closed whenever a fast-speed description is stored in relay MF1 and the car associated with the description passes over detector MVD before relay MFTEP becomes energized to open its back contact 158. In this manner slow-speed and fast-speed cars are detected and recorded whenever such cars pass the signal MLG before the respective timing relays have completed their operations to clear signal MLG. The two energizing circuits for recorder MVR are each opened by back contacts 151 and 155, respectively, of relay MN1 whenever a normal-speed description is stored in that relay; and normal-speed cars are free from violation detection under normal circumstances.

A similar recording device SVR and detector SVD are provided for the siding; and violations of signal SLG are detected and recorded in the manner described for violations of signal MLG.

The violation recorders MVR and SVR are assumed to be electrically operated cameras, spray guns or other devices capable of identifying cars which violate the leaving signals.

Highway intersection signaling system

In Fig. 8, an east-west divided highway is shown intersecting a north-south divided highway. Arrows indicate the directions of traffic in the various lanes.

Crossing signals EXG, WXG, NXG and SXG are shown located in advance of the intersection to govern eastbound, westbound, northbound and southbound traffic, respectively. Approach signals EAG, WAG, NAG and SAG are shown on the approaches to the signals EXG, WXG, NXG and SXG, respectively. The purpose of the approach signals is to provide advance information to approaching traffic concerning the aspects displayed by the respective crossing signals. If, for example, crossing signal EXG displays a red aspect, approach signal EAG displays a yellow aspect to warn approaching eastbound vehicles that they must be prepared to stop at the intersection. Signal EAG displays a green aspect whenever crossing signal EXG displays a green aspect. It is assumed that the distance between any crossing signal and its respective approach signal is at least equal to the maximum braking distance for vehicles in accordance with highway speed considerations.

Approach detection devices EAD1, WAD1, NAD1 and SAD1 are shown located in advance of approach signals EAG, WAG, NAG and SAG, respectively. The purpose of the approach detection devices is to detect traffic approaching the intersection and to actuate a circuit network which controls the various signals to govern traffic approaching and crossing the intersection. The circuit network controls the various signals to permit the alternate crossing of the intersection by traffic travelling on the east-west highway and traffic travelling on the north-south highway. Since signal controls are initiated by cars passing the various approach detection devices, the distance between each detection device and its associated approach signal must be great enough to allow any change in signal aspects to occur before the car reaches the approach signal so that the car approaching may be governed in advance of signals EXG, WXG, NXG or SXG.

Additional approach detection devices EAD2, WAD2, NAD2 and SAD2 are shown located in advance of signals EXG, WXG, NXG and SXG, respectively; and the detectors function to detect traffic waiting to enter the intersection.

Crossing detection devices EXD, WXD, NXD and SXD are shown ahead of the crossing signals EXG, WXG, NXG and SXG, respectively. The purpose of the crossing detection devices is to indicate to the circuit network that traffic is entering the intersection from a particular direction.

Figure 9C:
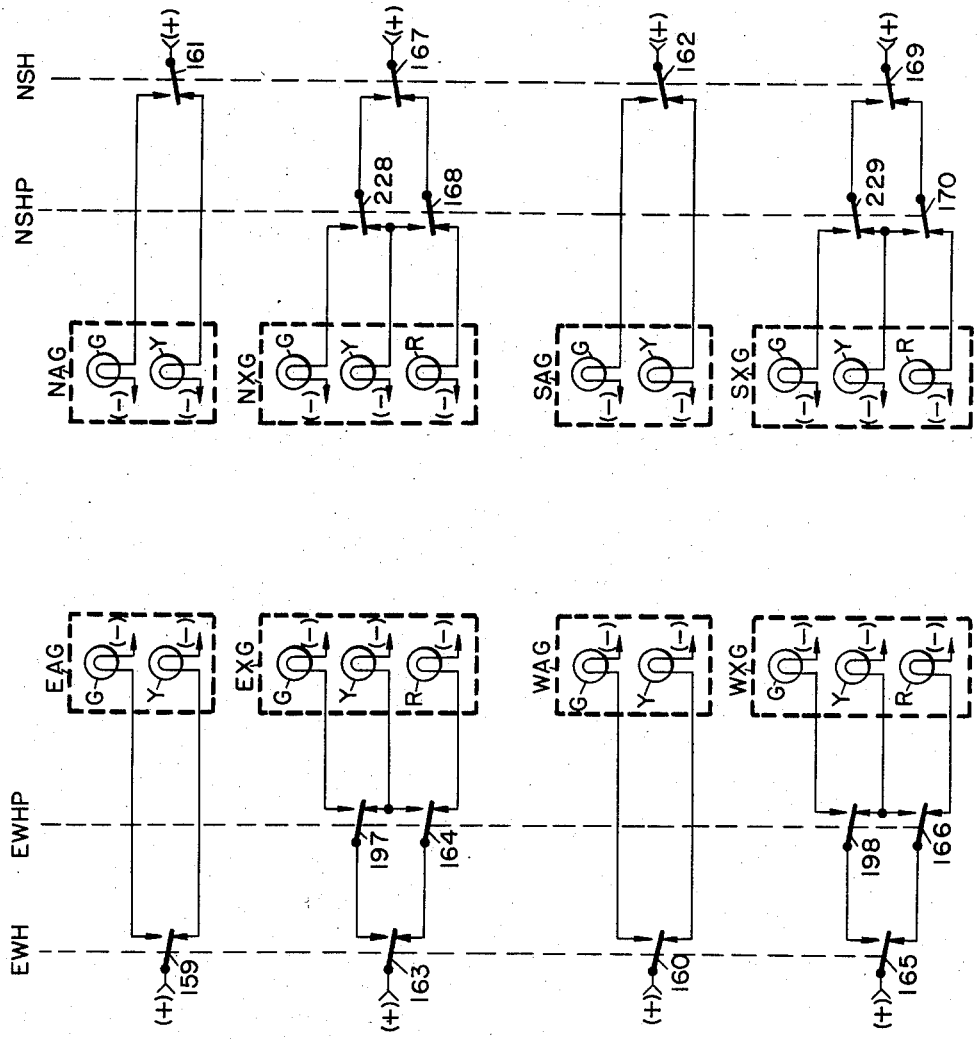

Referring now to Figs. 9A through 9C, a more detained description of signal, detection device and circuit operation can be given.

The various detection devices are assumed to be of the self-restoring treadle type, although photoelectric cells or other electronic detection devices can be used. The various detection devices are shown in block form, particular attention being given only to electrical contactors included in each device. Signals are also shown in block form, their various colored lamps being indicated as red R, yellow Y, and green G.

Approach relays EAR, WAR, NAR and SAR are provided to repeat actuations of the approach detectors EAD1 and EAD2, WAD1 and WAD2, NAD1 and NAD2, and SAD1 and SAD2, respectively, in response to passing traffic. Similarly, detection relays EDR, WDR, NDR and SDR are provided to repeat operations of the crossing detectors EXD, WXD, NXD and SXD, respectively.

Approach repeater relays EWAP and NSAP are provided to indicate the detection of approaching traffic on the east-west and north-south highways, respectively. The relays EWAP and NSAP are energized upon the detection of approaching vehicles and are subsequently deenergized by the detection of the same vehicles crossing the intersection.

Detection repeater relays EWDP and NSDP are provided to indicate the detection of traffic crossing the intersection along the east-west and north-south highways, respectively.

Signal control relays EWH and EWHP are provided for controlling the signals EAG, EXG, WAG and WXG to govern traffic on the east-west highway. Similar relays NSH and NSHP are provided to control signals NAG, NXG, SAG and SXG on the north-south highway.

A time element relay EWTE is provided to measure a predetermined time interval during which signals EXG and WXG may permit the crossing of the intersection by eastbound and/or westbound traffic after conflicting traffic is detected approaching on the north-south highway. A similar time element relay NSTE is provided to measure a time interval during which signals NXG and SXG may permit traffic on the north-south highway to cross the intersection after traffic is detected approaching on the east-west highway. The time intervals measured for the crossing signals EXG, WXG, NXG and SXG also apply to the approach signals EAG, WAG, NAG and SAG, respectively, since the approach signals give advance information concerning the conditions of the respective crossing signals. Relays EWTE and NSTE are repeated by relays EWTEP and NSTEP, respectively, each repeater relay indicating the completion of a timing operation. The time element relays EWTE and NSTE are assumed to be similar to that disclosed in Field, Patent No. 2,378,293, dated June 12, 1945; wherein the back contacts of each relay open when the relay is energized and the front contacts of each relay close after the relay completes a timing operation.

A directional control relay EWDC is provided to initiate signal controls to restrict eastbound or westbound traffic when traffic is detected on the north-south highway. Similarly, a directional control relay NSDC initiates signaling restrictions against northbound or southbound traffic when traffic is detected on the east-west highway.

An approach detection repeater stick relay EWADPS is provided to initiate controls over signals on the east-west highway in response to the detection of approaching traffic either on the east-west highway alone or on the east-west highway and the north-south highways in succession. A slow-acting repeater relay EWADPSA is provided to repeat relay EWADPS. Similar relays NSADPS and NSADPSA are provided to indicate the approach of northbound or southbound traffic under similar conditions.

An approaching traffic stick relay EWATS is provided to prevent the signals governing traffic on the north-south highway from displaying proceed aspects while the signals governing traffic on the east-west highway are displaying proceed aspects. A similar relay NSATS is provided to prevent the signals on the east-west highway from displaying proceed aspects while proceed aspects are displayed by the signals on the north-south highway.

The various relays are all shown deenergized, such conditions existing whenever energy is removed from the system for any reason whatsoever and subsequently restored.

Under these conditions, the yellow Y lamps of the approach signals EAG, WAG, NAG and SAG are energized by circuits including, respectively, back contacts 159 of relay EWH, 160 of relay EWH, 161 of relay NSH, and 162 of relay NSH. The red lamp R of signal EXG is energized by a circuit including back contact 163 of relay EWH and back contact 164 of relay EWHP; and the red R lamp of signal WXG is energized by a circuit including back contact 165 of relay EWH, and back contact 166 of relay EWHP. Similarly, the red R lamp of signal NXG is energized by a circuit including back contact 167 of relay NSH and back contact 168 of relay NSHP; and the red R lamp of signal SXG is energized by a circuit including back contact 169 of relay NSH and back contact 170 of relay NSHP.

Assume that an eastbound car (or cars) passes over the approach detector EAD1. Approach relay EAR is alternately energized and deenergized by the successive closings and openings of contact 171 of detector EAD1 in response to actuations of detector EAD1 by car wheels. Relay EWAP is then energized by the closing of front contact 172 of relay EAR; and relay EWAP is held energized by a stick circuit including front contact 173 of relay EWAP and back contact 174 of relay EWDP. It can be seen that relay EWAP can also be energized initially by the closing of front contact 175 of the westbound approach relay WAR when that relay is energized by closings of contact 176 of the westbound approach detector WAD1.

Relay EWADPS is now energized by a pick-up circuit extending from (+), including front contact 177 of relay EWAP, back contact 178 of relay EWTEP, back contact 179 of relay EWDC, and relay winding EWADPS, to (—); and stick contact 180 of relay EWADPS closes. Relay NSDC is energized by a pick-up circuit extending from (+), including front contact 181 of relay EWAP, wire 182, relay winding NSDC, back contact 183 of relay NSAP, wire 184, and front contact 185 of relay EWADPS, to (—); but the energization of relay NSDC has no effect on circuit operation at this time.

Repeater relay EWADPSA is energized by the closing of front contact 186 of relay EWADPS, relay EWADPSA being slow-acting in picking up for reasons to be explained.

At this time, relays EWH and EWATS are energized; relay EWH being energized by a pick-up circuit extending from (+), including back contact 187 of relay NSTE, back contact 188 of relay NSTEP, back contact 189 of relay NSATS, wire 190, front contact 191 of relay EWADPSA, back contact 192 of relay EWTEP, and relay winding EWH, to (—); relay EWATS being energized by a circuit extending from (+), including front contact 193 of relay EWADPSA, back contact 194 of relay EWDC, and relay winding EWATS, to (—); and relay EWATS is held energized by a stick circuit including back contact 195 of relay EWDC and front contact 196 of relay EWATS.

The energization of relay EWH results in the deenergization of the yellow Y lamps of the approach signals EAG and WAG by the opening of back contacts 159 and 160, respectively, of relay EWH; and the green G lamps of signals EAG and WAG are energized by the closing of front contacts 159 and 160, respectively, of relay EWH. The red R lamps of the crossing signals EXG and WXG are deenergized by the opening of back contacts 163 and 165, respectively, of relay EWH. The yellow Y lamp of signal EXG is energized by a circuit including front contact 163 of relay EWH and back contact 197 of relay EWHP; and the yellow Y lamp of signal WXG is energized by a circuit including front contact 165 of relay EWH and back contact 198 of relay EWHP. At the same time, slow-acting relay EWHP is energized by the closing of front contact 199 of relay EWH. When relay EWHP picks up its armature the yellow Y lamps of signals EXG and WXG are deenergized by the opening of back contacts 197 and 198 respectively, of relay EWHP; the green G lamps of signals EXG and WXG being energized by the closing of front contacts 197 and 198, respectively, of relay EWHP. It can now be seen that the reason for causing relay EWHP to have slow pick-up characteristics is to cause signals EXG and WXG to display yellow aspects for a perceptable period of time. In other words, in changing from red to green indications and signals display an intermediate indication of yellow, in accordance with common traffic signaling practice.

When the eastbound car passes over the crossing detector EXD, contact 200 of detector EXD closes to energize detector relay EDR. Relay EWDP is now energized as the result of the closing of front contact 201 of relay EDR. A resistor and a capacitor 201a in series are connected in parallel with relay winding EWDP to introduce slow-release characteristics into the operation of relay EWDP for reasons to be explained later. It can be seen that relay EWDP can also be energized by the closing of front contact 202 of relay WDR when that relay is operated in response to actuations of contact 203 of detector WXD by westbound traffic.

The stick circuit for relay EWAP is opened by back contact 174 of relay EWDP resulting in the deenergization of relay EWAP. The subsequent opening of front contact 181 of relay EWAP causes the deenergization of relay NSDC.

When the car completely passes detector EXD relay EDR is deenergized by the opening of contact 200 of detector EXD. Front contact 201 of relay EDR opens the pick-up circuit for relay EWDP, relay EWDP releasing its armature in accordance with its slow release time.

At this time, the circuit network is so aligned that relays EWADPS, EWADPSA, EWATS, EWH and EWHP are energized; signals EAG, WAG, EXG and WXG display green aspects; and signal NAG and SAG display yellow aspects while signals NXG and SXG display red aspects.

If other eastbound or westbound cars approach the intersection at this time, the signals EAG, EXG, WAG and WXG all display green aspects. As the cars advance through the intersection, relays EAR or WAR, EWAP, NSDC, EDR or WDR and EWDP operate as previously described; and relays EWADPS, EWADPSA, EWATS, EWH and EWHP remain energized throughout.

It can be seen from the drawings that a comparable network for the north-south highway is provided; and this circuit network is similar to that described above for the east-west highway. Thus, northbound or southbound cars travelling initially through the highway intersection produce similar circuit operations resulting in the energization of relays NSADPS, NSADPSA, NSATS, NSH and NSHP and causing signals NAG, NXG to display green aspects; signals EAG and WAG displaying yellow aspects while signals EXG and WXG display red aspects.

In view of the preceding description it can be seen that relays associated with one or the other of the two highways are always energized except when energy is removed from and then restored to the system.

Assume now that a northbound car is detected approaching the intersection after an eastbound or westbound car passes through the intersection, it being also assumed that no other approaching eastbound or westbound cars are detected. As previously described, relays EWADPS, EWADPSA, EWATS, EWH and EWHP are energized, signals EAG, WAG, EXG and WXG display green aspects, and signals NAG and SAG display yellow aspects while signals NXG and SXG display red aspects.

When the northbound car passes over the approach detector NAD1 contact 204 of detector NAD1 is alternately closed and opened resulting in the alternate energization and deenergization of relay NAR. Relay NSAP is energized by the closing of front contact 205 of relay NAR; and relay NSAP is held energized by a stick circuit including front contact 206 of relay NSAP and back contact 207 of relay NSDP.

Relay NSADPS is now energized by a pick-up circuit extending from (+), including front contact 208 of relay NSAP, back contact 209 of relay NSTEP, back contact 210 of relay NSDC, and relay winding NSADPS, to (—); and front contact 211 of relay NSADPS closes a stick circuit for relay NSADPS.

Relay EWDC is energized by a pick-up circuit extending from (+), including front contact 212 of relay NSAP, wire 213, relay winding EWDC, back contact 214 of relay EWAP, wire 215, and front contact 216 of relay NSADPS, to (—).

The energization of relay EWDC results in the deenergization of relays EWATS and EWADPS; relay EWATS being deenergized by the opening of its pick-up and stick circuits by back contacts 194 and 195, respectively, of relay EWDC; relay EWADPS being deenergized by the opening of its stick circuit at back contact 179 of relay EWDC.

Relay EWADPSA is now deenergized by the opening of front contact 186 of relay EWADPS. Relay EWH is subsequently deenergized by the opening of front contact 191 of relay EWADPSA.

The deenergization of relay EWH causes approach signals EAG and WAG to change their aspects from green to yellow, and further causes crossing signals EXG and WXG to change their aspects from green to yellow. The green G lamps of signals EAG and WAG are deenergized by the opening of front contacts 159 and 160, respectively, of relay EWH; and the yellow Y lamps of the signals EAG and WAG are energized by the closing of back contact 159 and 160, respectively, of relay EWH. The green G lamps of signals EXG and WXG are deenergized and the yellow Y lamps of the signals are energized by the opening of front contacts 163 and 165, respectively, of relay EWH and the closing of back contacts 163 and 165, respectively, of relay EWH.

The previous energization of relay NSADPS results in the energization of the slow-acting relay NSADPSA by the closing of front contact 217 of relay NSADPS. When relay NSADPSA picks up its armature, relay NSATS is energized by a pick-up circuit extending from (+), including front contact 218 of relay NSADPSA, back contact 219 of relay NSDC, and relay winding NSATS, to (—); and relay NSATS is held energized by a stick circuit including back contact 220 of relay NSDC and front contact 221 of relay NSATS. At the same time, relay NSH is energized by a pick-up circuit extending from (+), including back contact 222 of relay EWTE, back contact 223 of relay EWTEP, back contact 224 of relay EWATS, wire 225, front contact 226 of relay NSADPSA, back contact 227 of relay NSTEP, and relay winding NSH, to (—).

The yellow Y lamps of signals NAG and SAG are now deenergized by the opening of back contacts 161 and 162, respectively, of relay NSH; and the green G lamps of these signals are energized by the closing of front contacts 161 and 162, respectively, of relay NSH. The red R lamps of signals NXG and SXG are deenergized by the opening of back contacts 167 and 169, respectively, of relay NSH. The yellow Y lamp of signal NXG is energized by a circuit including front contact 167 of relay NSH and back contact 228 of relay NSHP; and the yellow Y lamp of signal SXG is energized by a circuit including front contact 169 of relay NSH and back contact 229 of relay NSHP.

At this time, the slow-acting relay NSHP is energized by the closing of front contact 230 of relay NSH. Relay EWHP, being previously deenergized by the opening of front contact 199 of relay EWH, releases its armature at this time. Signals EXG and WXG change their aspects from yellow to red, the yellow Y lamps of signals EXG and WXG being deenergized by the opening of front contacts 164 and 166, respectively, of relay EWHP; and the red R lamps of these signals are energized by the closing of back contacts 164 and 166, respectively, of relay EWHP. Relay NSHP now picks up its armature causing signals NXG and SXG to change their aspects from yellow to green. The yellow Y lamps of signals NXG and SXG are deenergized by the opening of back contacts 228 and 229, respectively, of relay NSHP; and the green G lamps of these signals are energized by the closing of front contacts 228 and 229, respectively, of relay NSHP. The reason for causing relay NSADPSA to have slow pick-up characteristics is now apparent. Since energizations of relay NSADPSA result, under the described conditions, in the energization of signal control relay NSH, signals NAG, NXG, SAG and SXG are operated to display less restrictive aspects. Such signal operations should be delayed until signals EAG, EXG, WAG and WXG are operated by the deenergization of relay EWH to display more restrictive aspects. The pick-up time of relay NSADPSA is adjusted to accomplish such a mode of signal operation.

The condition of the various signals at this time is such that traffic is restricted on the east-west highway while proceed indications are given to traffic on the north-south highway. Thus, it can be seen that the detection of approaching cars on the north-south highway immediately initiates the clearing of the signals governing traffic on that highway under the conditions that no further approaching traffic is detected on the east-west highway.

When the northbound car passes over the detector NXD, contact 231 of detector NXD alternately closes and opens in response to the passage of car wheels, resulting in successive energizations and deenergizations of relay NDR. Relay NSDP is energized by the closing of front contact 232 of relay NDR; and the resultant opening of back contact 207 of relay NSDP removes energy from the stick circuit for relay NSAP.

Relay EWDC is now deenergized by the opening of front contact 212 of relay NSAP. A pick-up circuit for relay EWATS is now restored by the closing of back contact 194 of relay EWDC.

When the northbound car passes detector NXD to enter the intersection, relay NDR is deenergized by the opening of contact 231 of detector NXD. Subsequently, relay NSDP is deenergized by the opening of front contact 232 of relay NDR. A resistor and capacitor 233 are connected in parallel with relay winding NSDP to produce slow-release characteristics in this relay in accordance with speed and normal car spacing considerations for the highway. In other words, the slow-release time of relay NSDP is such that relay NSDP is responsive to groups of cars rather than to individual cars. Relay EWDP is made slow-acting, as previously noted, for the same purpose.

If other northbound or southbound cars should pass over approach detector NAD1 before relay NSDP drops away, relay NSAP is energized as previously described, but its stick circuit is open at back contact 207 of relay NSDP. A resistor and capacitor 234 are connected in parallel with relay winding NSAP to produce slow-acting characteristics in relay NSAP so that relay NSAP is not responsive to the passage of individual cars but rather to the passage of groups of cars. In this way, unnecessary operations of relay NSAP are prevented when its stick circuit is open. A similar resistor and capacitor 235 are connected in parallel with relay winding EWAP for the same purpose.

The release times of relays EWAP and NSAP are assumed to be not greater than the release times of relays EWDP and NSDP, respectively. If, for example, a northbound car approaches the intersection, causing the energization of relays NSAP and NSDP in the manner previously described, the stick circuit for relay NSAP is opened by back contact 207 of relay NSDP. After the car passes detector NXD, relay NSDP is deenergized resulting in the closing of its back contact 207 in the stick circuit for relay NSAP. To render this stick circuit ineffective, front contact 206 of relay NSAP must open before back contact 207 of relay NSDP closes; and such is the case if the release time of relay NSAP is not greater than that of relay NSDP. If relay NSAP were to be held energized under the conditions stated, a timing delay is produced in the operation of signals on the east-west highway should eastbound or westbound cars be detected. The nature of the timing delay can be seen in a subsequent description of circuit operation when conflicting traffic groups are detected.

In order to describe the operation of the highway intersection signalling system under heavy traffic conditions, thus illustrating the ability of the system to permit the alternate use of the intersection by traffic on the two highways, assume that long lines of cars approach the intersection from all directions. It can be noted that since the circuit network does not differentiate between eastbound traffic and westbound traffic or between northbound traffic and southbound traffic, spaced groups of cars travelling in opposite directions on one highway produce the same effects in circuit operation as are produced by an unbroken line of cars travelling in one direction.

Assume that the first car to be detected is travelling on the east-west highway; and further assume the east-west highway to be the last used by previous traffic. In other words, relays EWH, EWHP, EWATS, EWADPS and EWADPSA are energized, signals along the east-west highway display proceed aspects and signals along the north-south highway display restrictive aspects at the time when the first car is detected approaching on the east-west highway.

When either approach detector EAD1 or WAD1 is actuated, relay EAR or WAR is energized in response to the respective closing of contact 171 of detector EAD1 or contact 176 of detector WAD1. Relay EWAP is then energized by the closing of either front contact 172 of relay EAR or front contact 175 of relay WAR; and contact 173 of relay EWAP closes the stick circuit for relay EWAP.

The closing of front contact 181 of relay EWAP energizes relay NSDC; and relay NSDC remains energized until traffic is detected on the north-south highway.

At this time, assume that traffic is detected approaching on the north-sourth highway by detector NAD1 or SAD1, causing relay NAR or SAR to be energized in the manner previously described. Relay NSAP is then energized following the energization of either relay NAR or SAR; and front contact 206 of relay NSAP closes the stick circuit for relay NSAP. The opening of back contact 183 of relay NSAP causes relay NSDC to be deenergized, while the closing of front contact 208 of relay NSAP causes the energization of relay NSADPS.

Relay NSADPSA is now energized by the closing of front contact 217 of relay NSADPS, relay NSADPSA being slow-acting in picking up its armature.

The time element relay EWTE and relay NSATS are energized, relay EWTE starting a timing operation. Relay NSATS is energized upon the closing of front contact 218 of relay NSADPSA, causing back contact 189 of relay NSATS to open in the previously described pick-up circuit for relay EWH. However, front contact 236 of relay EWH, connected in parallel with back contact 189 of relay NSATS by wires 237 and 238, is closed to maintain energization of relay EWH. Relay EWTE is energized by a pick-up circuit extending from (+), including back contact 187 of relay NSTE, back contact 188 of relay NSTEP, wire 237, front contact 236 of relay EWH, wire 238, front contact 239 of relay NSADPSA, wire 240, front contact 241 of relay EWADPSA, back contact 242 of relay EWTEP, and relay winding EWTE, to (—). Back contact 222 of relay EWTE opens in the pick-up circuits for relays NSTE and NSH.

The signals governing traffic on the east-west highway continue to display proceed aspects, allowing traffic on that highway to proceed across the intersection.

When cars are detected passing over either detector EXD or WXD relay EDR or WDR is energized in response to respective closings of contact 200 of detector EXD or contact 203 of detector WXD. Relay EWDP is then energized by the closing of either front contact 201 of relay EDR or front contact 202 of relay WDR. Back contact 174 of relay EWDP opens the stick circuit for relay EWAP. It can be noted here that if relay EWAP is deenergized the closing of its back contact 214 allows the energization of relay EWDC; and energization of relay EWDC results in the deenergization of relays EWATS, EWADPS, EWADPSA, EWH and EWHP in succession. The signals governing traffic on the east-west highway would then be operated to display restrictive aspects. Since this condition is not desirable at this time, energization of relay EWAP is maintained through the action of detectors EAD2 and WAD2, these detectors being located at a predetermined distance in advance of signals EXG and WXG, respectively, so that one of these detectors is certain to be actuated by approaching traffic whether or not such traffic enters the intersection. It can be seen that contact 243 of detector EAD2 is connected in parallel with contact 171 of detector EAD1, the closing of either contact 171 or 243 causing the energization of relay EAR. Similarly, contact 244 of detector WAD2 is connected in parallel with contact 176 of detector WAD1, the closing of either contact 176 or 244 causing the energization of relay WAR. Thus, either the pick-up or the stick circuit for relay EWAP is closed at any time under conditions of heavy traffic. Detectors NAD2 and SAD2 are provided on the north-south highway for a similar reason.

At some instant, relay EWTE completes its timing operation closing its front contact 245 which causes the energization of relay EWTEP.

At this time, relays EWTE, EWH and EWADPS become deenergized while relay EWDC becomes energized. The opening of back contact 242 of relay EWTEP causes the deenergization of relay EWTE while the opening of back contacts 178 and 192 of relay EWTEP causes the deenergization of relays EWADPS and EWH, respectively; relay EWDC being energized by a pick-up circuit including front contact 212 of relay NSAP and front contact 246 of relay EWTEP.

The deenergization of relay EWH causes signals EAG, EXG, WAG and WXG to change their aspects from green to yellow, thereby restricting traffic on the east-west highway.

Relay EWTEP is now deenergized by the opening of front contact 245 of relay EWTE. At the same time, relay EWATS is deenergized by the opening of back contacts 194 and 195 of relay EWDC.

When relay EWTEP is deenergized, the opening of its front contact 246 causes the deenergization of relay EWDC; and subsequent closings of back contacts 178 and 223 of relay EWTEP cause the energization of relays EWADPS and NSH, respectively. Relay NSH then opens its back contacts and closes its front contacts to cause signals NAG and SAG to change their aspects from yellow to green, while causing signals NXG and SXG to change their aspects from red to yellow.

At this time, the slow-acting relay EWHP, deenergized by the opening of front contact 199 of relay EWH, releases its armature causing signals EXG and WXG to change their aspects from yellow to red.

Relay EWADPSA, being energized by the closing of front contact 186 of relay EWADPS, picks up its armature to cause the energization of relays EWATS and NSTE. Relay EWATS is energized by the closing of front contact 193 of relay EWADPSA; and relay NSTE is energized by a pick-up circuit extending from (+), including back contact 222 of relay EWTE, back contact 223 of relay EWTEP, wire 247, front contact 248 of relay NSH, wire 249, front contact 250 of relay EWADPSA, wire 251, front contact 252 of relay NSADPSA, back contact 253 of relay NSTEP, and relay winding NSTE, to (—).

Slow-acting relay NSHP picks up its armature at this time causing signals NXG and SXG to change their aspects from yellow to green. The signals governing traffic on the north-south highway now display proceed aspects while the signals governing traffic on the east-west highway display restrictive aspects. Circuit and relay operations are assumed to be such that a synchronism exists between operations of the signals on the two highways. For example, at instants when signals NXG and SXG display red, yellow or green aspects signals EXG and WXG display green, yellow or red aspects, respectively. Similarly, when signals NAG and SAG display yellow or green aspects signals EAG and WAG display green or yellow aspects, respectively.

Cars travelling on the north-south highway are permitted to cross the intersection until relay NSTE completes its timing operation, the completion of a timing operation by relay NSTE resulting in the energization of relay NSTEP through the closing of front contact 254 of relay NSTE.

When relay NSTEP is energized relays NSTE, NSH and NSADPS are simultaneously deenergized by the opening of back contacts 253, 227 and 209, respectively, of relay NSTEP; and relay NSDC then is energized when front contact 255 of relay NSTEP closes.

The deenergization of relay NSH causes signals NAG, SAG, NXG and SXG to change their aspects from green to yellow, restricting traffic on the north-south highway.

When relay NSDC becomes energized relay NSATS is deenergized by the opening of back contacts 219 and 220 of relay NSDC. At the same time, relay NSTEP is deenergized by the opening of front contact 254 of relay NSTE.

The deenergization of relay NSTEP results in the deenergization of relay NSDC by the opening of front contact 255 of relay NSTEP and further results in the energization of relays EWH and NSADPS by the closing of back contacts 188 and 209, respectively, of relay NSTEP.

The energization of relay EWH causes signals EAG and WAG to change their aspects from yellow to green while causing signals EXG and WXG to change their aspects from red to yellow.

Slow-acting relay NSHP, deenergized by the opening of front contact 230 of relay NSH, now releases its armature causing signals NXG and SXG to change their aspects from yellow to red.

Upon the energization of relay NSADPS, its front contact 217 closes to energize relay NSADPSA. Subsequently, time element relay EWTE and relay NSATS are energized by the closing of front contacts 239 and 218, respectively, of relay NSADPSA. Back contact 189 of relay NSATS opens but front contact 236 of relay EWH is closed maintaining a pick-up circuit for relays EWTE and EWH.

Slow-acting relay EWHP now picks up its armature causing signals EXG and WXG to change their aspects from yellow to green. Signal operations are now complete for permitting traffic on the east-west highway to proceed while restricting traffic on the north-south highway.

Repeated circuit operations occur as described above, permitting the alternate use of the intersection by traffic on the two highways, as long as traffic is detected approaching on the two highways.

In the preceding descriptions of circuit operation, it was assumed that traffic on the east-west highway was detected before traffic on the north-south highway was detected, any previous traffic having been assumed to travel along the east-west highway. Similar circuit operations result regardless of the direction in which detected traffic is moving.

A further condition must be described, however, in which approaching traffic on the east-west highway and approaching traffic on the north-south highway are detected simultaneously. Assume, for example, that previous traffic travelled on the east-west highway, resulting in the energization of relays EWH, EWHP, EWATS, EWADPS and EWADPSA.

In view of the preceding descriptions of circuit operation, it can be seen that relays EAR or WAR, EWAP, NAR or SAR, NSAP, NSADPS and NSADPSA can be energized in response to the detection of traffic. Relays EWDC and NSDC cannot be energized, however, since back contact 214 of relay EWAP and back contact 183 of relay NSAP are open in the respective pick-up circuits for relays EWDC and NSDC. Since relay EWDC cannot be energized, its back contact 195 cannot open to deenergize relay EWATS. Consequently, relays NSTE and NSH are held deenergized by the open back contact 224 of relay EWATS. Relay NSATS is energized, however, opening its back contact 189 in the energizing circuit for relays EWH and EWTE; but front contact 236 of relay EWH is closed shunting back contact 189 of relay NSATS. Therefore, relay EWH remains energized along with its repeater relay EWHP; and relay EWTE starts a timing operation which, when completed, produces circuit and signal operations as previously described.

Similar circuit operations can be described for simultaneous detections of approaching traffic on the two highways after previous traffic crosses the intersection from the north-south highway. In this case, the traffic on the north-south highway is allowed to proceed. Thus, in the case of simultaneous detections of conflicting traffics, the circuit network is biased in favor of the traffic travelling on the highway last used by previous traffic, as indicated by the energization of either relay EWATS or relay NSATS.

Push buttons EPB, WPB, NPB and SPB shown in Figs. 9A and 9B incorporated into the signaling system for use by pedestrians or for testing purposes; and the push buttons are assumed to be located at or near signals EXG, WXG, NXG and SXG, respectively. Push button EPB, for example, is connected in parallel with approach detectors EAD1 and EAD2 so that a depressing of push button EPB closes a circuit to energize relay EAR. Thus, push button EPB initiates circuit operations which are identical to those initiated by actuations of detectors EAD1 or EAD2 by passing cars.

Having described a highway signalling system as one specific embodiment of the present invention, it is desired to be understood that this form is selected to facilitate in the disclosure of the invention rather than to limit the number of forms which it may assume; and it is to be further understood that various modifications, adaptations and alterations may be applied to the specific form shown to meet the requirements of practice, without in any manner departing from the spirit or scope of the present invention.

What I now claim is:

1. In a highway signalling system, a highway having a dual lane passing section for the segregation of traffic in a particular direction, highway traffic signals located at said dual lane section for governing entering and leaving traffic, speed detection means, a speed description storage means for storing speed descriptions for distinct groups of highway vehicles in response to said speed detection means, signal control means for controlling said signals in accordance with speed descriptions stored by said speed detection means, said storage means being operable to store speed descriptions in a sequence identical to that of respective groups of vehicles and being operable for selectively transferring speed descriptions in step with the progress of respective groups of vehicles so that said signals govern groups of vehicles in accordance with respective speed descriptions for the groups of vehicles.

2. In a signalling system for highways, dual lane location comprising a main lane and a passing lane for segregating traffic in a particular direction, speed detection means for detecting speeds of groups of vehicles, speed description storage means for storing speed descriptions in sequence for successive groups of vehicles in response to operations of said speed detection means, entrance detection means for detecting vehicles entering either lane in said dual lane location, timing means associated with each lane in said dual lane location for applying timing penalties against vehicles travelling at abnormal speeds, circuit means responsive to said speed description means and to said entrance detection means for actuating said timing means in accordance with the speed and route of the first vehicle in a particular group, traffic signalling means at the exit portion of each lane in said dual lane location, and circuit means responsive to operations of said timing means for causing said exit signals to display stop aspects for vehicles detected travelling at abnormal speeds.

3. In a signalling system for a highway having a dual lane location for segregating traffic in a particular direction, said dual lane location comprising a main lane and a passing lane, speed detection means for detecting traffic speeds, said speed detection means being capable of detecting distinct groups of vehicles and the speed of the first vehicle in each group, banks of speed description relays, each of said banks being capable of storing a speed description for a group of vehicles, said banks being arranged to form a series of banks for storing in sequence speed descriptions for successive approaching groups of vehicles and to provide one bank associated with each end of each lane in said dual lane location for storing speed descriptions associated with entering and leaving groups of vehicles, circuit means responsive to said speed detection means for storing speed descriptions in said banks of speed description relays, transfer means for automatically transferring speed descriptions through said series of banks in sequence, said transfer means being actuated by said series of banks whenever one bank in said series is free to receive a speed description stored in an immediate preceding bank in said series of banks, entrance detection means for detecting vehicles entering either lane in said dual lane location, circuit means responsive to said entrance detection means for selectively transferring speed descriptions for particular groups of vehicles from said series of banks of speed description relays to one of said banks associated with the entering ends of lanes in said dual lane location, said circuit means selectively transferring a speed description for a particular group of vehicles in accordance with the route selected by the first vehicle in the group, circuit means responsive to said entrance detection means for transferring speed descriptions from said banks of speed description relays associated with the entering ends of lanes in said dual lane location to said banks associated with the leaving ends of lanes in said dual lane location, leaving detection means for detecting vehicles leaving either lane in said dual lane location, and circuit means responsive to said leaving detection means for removing speed descriptions from said banks of speed description relays associated with the leaving ends of lanes in said dual lane location.

4. In combination, a divided highway comprising a single lane for traffic in each direction, a dual lane passing section along each of said single directional traffic lanes, the two lanes in said dual lane section being separated for the segregation of groups of vehicles, detection devices, said detection devices being located on the approach to and in said dual lane section and being actuated by the passage of traffic, traffic entrance signals, one of said entrance signals being located at the entering end of each lane in said dual lane section, said entrance signals governing traffic entering said dual lane section, traffic leaving signals, one of said leaving signals being located at the leaving end of each lane in said dual section, said leaving signals governing traffic leaving said dual lane section, circuit means responsive to actuations of said detection devices by passing traffic for controlling said traffic entrance signals and said traffic leaving signals, violation recording devices, said recording devices being capable of identifying vehicles violating said traffic leaving signals, and circuit means responsive to actuations of said detection devices by the passage of traffic for controlling said violation recording devices.

5. In a signalling system for a divided highway having a single lane for traffic in each direction, a duel lane passing section along each of said single directional lanes, the two lanes in said dual lane section being separated for the segregation of groups of vehicles; said dual lane section comprising, approach detection devices actuated by the passage of traffic approaching said dual lane section, electro-responsive speed detection devices for determining speeds of groups of vehicles, circuit means responsive to operations of said approach detection devices for operating said speed detection devices, banks of electroresponsive speed description devices, each of said banks being capable of storing a speed description for a group of vehicles, circuit means responsive to operations of said speed detection devices to introduce speed descriptions into said banks of speed description devices, entrance detection devices actuated by the passage of traffic entering said dual lane section, circuit means responsive to said entrance detection devices for transferring speed descriptions from one of said banks of speed description devices to a succeeding bank as traffic progresses through said dual lane section, traffic entrance signals for governing traffic entering said dual lane section, one of said signals being located at the entering end of each lane in said dual lane section, circuit means responsive to said speed description devices and said entrance detection devices for controlling said traffic entrance signals to display aspects in accordance with the magnitudes of the speeds described for groups of vehicles entering said dual lane section, traffic leaving signals for governing traffic leaving said dual lane section, one of said traffic leaving signals being located at the leaving end of each lane in said dual lane section, circuit means responsive to said speed description devices and to operations of said entrance detection devices for controlling said traffic leaving signals to display aspects in accordance with the magnitudes of the speeds described for groups of vehicles entering said dual lane section, leaving detection devices actuated by the passage of traffic leaving said dual lane section, circuit means responsive to operations of said leaving detection devices for removing speed descriptions associated with respective departing groups of vehicles from said speed description devices, violation detection devices actuated by the passage of traffic leaving said dual lane section, violation recording devices for identifying vehicles violating said traffic leaving signals, and circuit means responsive to said speed description devices and to operations of said violation detection devices for actuating said violation recording devices.

6. In a signaling system for a divided highway having a single lane for traffic in each direction, a dual lane passing section along each single directional lane, the two lanes in said dual lane section being separated for the segregation of groups of vehicles, said dual lane section comprising, a first and a second approach detector actuated by the passage of vehicles approaching said dual lane section, a first electroresponsive approach detection device for indicating the passage of vehicles, circuit means for operating said first electroresponsive approach detection device in response to actuations of said first approach detector by passing vehicles, a second electroresponsive approach detection device for indicating the passage of groups of vehicles, said second electroresponsive approach detection device being slow-acting to a degree determined by speed and distance considerations for said highway, circuit means responsive to operations of said first electroresponsive approach detection device for operating said second electroresponsive approach detection device, a plurality of electroresponsive speed detection devices, said speed detection devices being individually slow-acting to degrees determined by the distance between said first and second approach detectors and the ranges of vehicle speeds to be detected, circuit means responsive to operations of said second electroresponsive approach detection device for operating said speed detection devices, a plurality of electroresponsive speed description devices, each of said speed description devices being capable of storing a speed description for a group of vehicles, circuit means responsive to operations of said second approach detector and said speed detection devices to introduce speed descriptions into said speed description devices, and circuit means responsive to operations of said second electroresponsive approach detection device for maintaining storages of speed descriptions in said speed description devices.

7. In a signalling system for a divided highway having a single lane for traffic in each direction, a dual lane passing section along each single directional lane, the lanes in said dual lane section being separated for the segregation of groups of vehicles; said dual lane section comprising, approach detectors actuated by the passage of vehicles approaching said dual lane sections, entrance detectors actuated by the passage of vehicles entering said dual lane section, leaving detectors actuated by the passage of vehicles leaving said dual lane section, electroresponsive speed detection means responsive to actuations of said approach detectors for detecting speeds of groups of vehicles, banks of electroresponsive speed description devices, each of said banks being capable of storing a speed description for a group of vehicles, said banks being in the form of a series of banks capable of storing in sequence speed descriptions for respective successive groups of vehicles, electroresponsive means responsive to the operations of said speed detection means for introducing speed descriptions into said banks of speed description devices, electroresponsive transfer means for transferring speed descriptions between successive banks of speed description devices in response to actuations of said entrance detectors by groups of vehicles, said transfer means acting to transfer speed descriptions in response to movements of respective groups of vehicles; and electroresponsive means for causing removal of speed descriptions associated with groups of vehicles leaving said dual lane section from said banks of speed description devices in response to actuations of said leaving detectors by groups of vehicles.

8. In a signalling system for a divided highway having a single lane for traffic in each direction, a dual lane passing section along each single directional lane, the lanes in said dual lane section being separated for the segregation of groups of vehicles; said dual lane section comprising, approach detectors actuated by the passage of vehicles approaching said dual lane section, electroresponsive speed detection means responsive to actuations of said approach detectors for detecting speeds of groups of vehicles, said speed detection means classifying groups of vehicles as slow-speed, normal-speed, or fast-speed in accordance with predetermined speed ranges for said highway, said speed detection means classifying each group of vehicles according to the speed of the first vehicle in the group, electroresponsive speed description means for storing speed descriptions for groups of vehicles in response to operations of said speed detection means, said speed description means storing speed descriptions in a sequence determined by the sequence in which respective groups of vehicles identified by the speed descriptions pass said approach detectors, entrance detectors actuated by the passage of traffic entering said dual lane section, said entrance detectors being located at the entering end of each lane in said dual lane section, traffic entrance signals located one at the entering end of each lane in said dual lane section for governing traffic entering said dual lane section, and electroresponsive signal control means responsive to operations of said speed description means and to actuations of said entrance detectors for controlling said entrance signals, said entrance signals displaying aspects directing vehicles in a group either to follow or to pass the first vehicle in the group.

9. In a signalling system for a divided highway having a single lane highway for traffic in each direction, a dual lane passing section along each single directional lane, the lanes in said dual lane section being separated for the segregation of groups of vehicles; said dual lane sections comprising, approach detectors actuated by the passage of vehicles approaching said dual lane section, electroresponsive speed detection means responsive to actuations of said approach detectors for detecting speeds of groups of vehicles, said speed detection means classifying groups of vehicles as slow-speed, normal-speed, or fast-speed in accordance with predetermined speed ranges for said highway, said speed detection means classifying each group of vehicles according to the speed of the first vehicle in the group, electroresponsive speed description means for storing speed descriptions for groups of vehicles in response to operations of said speed detection means, said speed description means storing speed descriptions in a sequence determined by the sequence in which respective groups of vehicles identified by the speed descriptions pass said approach detectors, entrance detectors actuated by the passage of traffic entering said dual lane sections, said entrance detectors being located at the entering ends of each lane in said dual lane section, traffic leaving signals located one at the leaving end of each lane in said dual lane section for governing traffic leaving said dual lane section, a first electroresponsive signal control means responsive to operations of said speed description means and to actuations of one of said entrance detectors for controlling one of said leaving signals, a second electroresponsive signal control means responsive to operations of said speed description means and to actuations of the other of said entrance detectors for controlling the other of said leaving signals.

10. A signalling system for a divided highway having a single lane highway for traffic in each direction and having a dual lane passing section spaced at intervals along each single directional lane, the lanes in said dual lane section being separated for the segregation of groups of vehicles, said dual lane section comprising, a first and a second approach detector actuated by the passage of vehicles approaching said dual lane section, an approach detection relay, circuit means for operating said approach detection relay in response to actuations of said first approach detector, said approach detection relay responding to each vehicle in a group of vehicles passing said first approach detector, a slow-acting approach detection repeater relay having a release time equal to the time interval between successive passings of said first approach detector by groups of vehicles, such time interval between successive groups of vehicles being determined by speed and distance considerations for said highway, circuit means responsive to operations of said approach detection relay for operating said approach detection repeater relay within the operational limitations introduced by the slow-acting characteristics of said approach detection repeater relay, a slow-acting normal-speed detection relay, a slow-acting fast-speed detection relay, said normal-speed and said fast-speed detection relays being normally energized and having release times determined by the time intervals required for normal-speed and fast-speed vehicles, respectively, to traverse the distance between said first and second approach detectors, circuit means responsive to operations of said approach detection repeater relay for operating said normal-speed and fast-speed detection relays, a slow-speed description relay, a normal-speed description relay, a fast-speed description relay, pick-up circuit means responsive to operations of said normal-speed and fast-speed detection relays and to actuations of said second approach detector for selectively energizing one of said speed description relays at a time; an alternate circuit pick-up means for energizing said slow-speed description relay in response to operations of said normal-speed and fast-speed detection relays, said approach detection repeater relay, and said second approach detector; and stick circuit means responsive to said approach detection repeater relay for maintaining energization of said speed description relays.

11. In a signalling system for highway traffic, a highway having a dual lane passing section, highway vehicle speed detecting means located in the approach to said dual lane section, highway traffic entrance signals operable to display aspects for selectively directing highway vehicles into either lane of said dual lane section, highway traffic exit signals operable to selectively display stop and proceed aspects for vehicles leaving either lane of said dual lane section, a first signal control means responsive to said speed detection means for causing said exit signals to display a stop aspect for a limited time for the lane occupied by the abnormal speed vehicles, and a second signal control means for causing said entrance signal to display aspects for directing vehicles following into a particular lane when said abnormal speed vehicles have entered the other lane.

12. In a signalling system for highways, a highway having a dual lane passing section for highway vehicles comprising a main lane and a passing lane, highway vehicle speed detection means for detecting the abnormal and normal speeds of a highway vehicle approaching said dual lane section, highway vehicle entrance signals for selectively directing entering vehicular traffic into either lane of said dual lane section, a first vehicle occupancy detection means actuated in response to a highway vehicle entering said main lane, a second vehicle occupancy detection means activated in response to a highway vehicle entering said passing lane, a first circuit means responsive to said first vehicle detection means and said speed detection means for controlling the entrance signals to display an aspect for directing vehicles following an abnormal speed vehicle into the passing lane of said dual lane section, a second circuit means responsive to the actuation of said second vehicle detection means and said speed detecting means for causing said entrance signals to display an aspect for directing vehicles following an abnormal speed vehicle into the main lane of said dual lane section, exit traffic signals operable to selectively display stop and proceed aspects for highway vehicles leaving each lane of said dual lane section, a first exit signal control means responsive to the actuation of the speed detecting means and the first vehicle detection means for causing said exit signal to display a proceed aspect for vehicles leaving the passing lane and for causing said exit signal to display a stop aspect for vehicles leaving the main lane, and a second exit signal control means responsive to the actuation of the speed detection means and the second vehicle detection means for causing said exit signal to display a proceed aspect for vehicles leaving the main lane and to display a stop aspect for vehicles leaving the passing lane.

13. In a signaling system for a highway having a dual lane passing section for segregating traffic in a particular direction, highway vehicle traffic signals located at the entering and leaving ends of said dual lane section for governing highway vehicle traffic in each lane, means in the approach to said dual lane section for detecting vehicle speeds, and a signal control means responsive to said speed detection means for causing said entering and leaving signal of one lane of the dual lane passing section to display a stop aspect when highway vehicles traveling at abnormal speed have entered said one lane, said signal control means also causing said entering and leaving signals of the other lane of the dual lane passing section to display a proceed aspect for highway vehicles traveling at normal speeds.

14. In a highway signaling system, a highway having a dual lane passing section for the segregation of highway vehicle traffic in a particular direction, highway traffic signals located at the entering and leaving ends of said dual lane section for governing entering and leaving highway vehicle traffic, speed detection means located in advance of said dual lane section, circuit means responsive to said speed detection means for detecting distinct groups of highway vehicles and for detecting speeds of individual groups of highway vehicles, signal control means controlled by said circuit means for causing said entering signals to display indications for segregating each group of highway vehicles in acordance with the speed classification of the group, and other signal control means controlled by said circuit means for causing said leaving signals to display indications for allowing groups of vehicles of a particular speed classification to proceed in preference to groups of vehicles of the other speed classifications.

15. In a signaling system for a highway having a dual lane passing section for segregating highway traffic in a particular direction of travel, signals located at the entering end of said dual lane section for directing entering traffic, signals located at the leaving end of said dual lane section for governing leaving traffic, speed responsive means for detecting the speeds of highway vehicles approaching said dual lane section, a vehicle detector for each lane of the dual lane section located a short distance beyond said entering signals within such dual lane section, entering signal control means responsive to said speed detecting means and said vehicle detectors when a vehicle of abnormal speed has entered one lane of said dual lane section to cause said signals at the entering end of said dual lane section to display aspects for directing following highway vehicles to enter the other lane of the lane section, and leaving signal control means responsive to said speed detected means and said vehicle detectors for causing the signals at the leaving end of said dual lane section to display a stop aspect for said one lane and a proceed aspect for said other lane.

References Cited in the file of this patent

UNITED STATES PATENTS

| | | |
|---|---|---|
| 1,763,011 | Shaver | June 10, 1930 |
| 1,983,510 | Hitchcock | Dec. 4, 1934 |
| 2,034,533 | Parrill et al. | May 17, 1936 |
| 2,045,201 | Rabourdin et al. | June 23, 1926 |
| 2,229,234 | Williams | Jan. 21, 1941 |
| 2,297,683 | Barker | Oct. 6, 1942 |
| 2,325,435 | Sykora | July 27, 1943 |
| 2,347,194 | Holliday | Apr. 25, 1944 |